United States Patent
Callahan, III et al.

(10) Patent No.: US 10,303,494 B2
(45) Date of Patent: *May 28, 2019

(54) SYSTEM AND METHOD FOR RF DIGITIZATION AND COLLECTION

(71) Applicant: QRC, LLC, Fredericksburg, VA (US)

(72) Inventors: Thomas F. Callahan, III, Spotsylvania, VA (US); Sinisa Peric, Bethesda, MD (US)

(73) Assignee: QRC, LLC, Fredericksburg, VA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 14/265,211

(22) Filed: Apr. 29, 2014

(65) Prior Publication Data

US 2014/0325509 A1 Oct. 30, 2014
US 2017/0308387 A9 Oct. 26, 2017

Related U.S. Application Data

(63) Continuation of application No. 13/938,774, filed on Jul. 10, 2013, now Pat. No. 8,763,004, which is a (Continued)

(51) Int. Cl.
G06F 9/46 (2006.01)
G06F 9/448 (2018.01)
(Continued)

(52) U.S. Cl.
CPC ............. *G06F 9/448* (2018.02); *G06F 9/455* (2013.01); *G06F 9/4843* (2013.01); *G06F 9/50* (2013.01); *G06F 2209/482* (2013.01)

(58) Field of Classification Search
None
See application file for complete search history.

(56) References Cited

U.S. PATENT DOCUMENTS 5,436,847 A 7/1995 Schroer et al.
7,210,121 B2 4/2007 Xia et al.
(Continued)

FOREIGN PATENT DOCUMENTS

CN 101826889 A 9/2010
KR 20020016434 A 3/2002

OTHER PUBLICATIONS

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.
(Continued)

*Primary Examiner* — Tammy E Lee
(74) *Attorney, Agent, or Firm* — The Marbury Law Group, PLLC

(57) ABSTRACT

An RF digitization and collection system (RFDCS) and methods for implementing the RF digitization and collection system to manage an application storage and retrieval space (App Space), wherein the App Space includes apps that may perform various offline and/or real-time transforms of RF signals received, stored, or played back on the RFDCS. Also, in the various embodiments, the RFDCS may govern the system resources available to these apps while ensuring that the RFDCS's core system functions are not impacted by the execution of one or more of these apps in the App Space. Thus, the RFDCS may enable users to utilize real-time signal processing by running various specialized apps without compromising the RFDCS's core system function, thereby promoting dynamic "on-the-fly" transformation of raw RF signals without compromising the user's overall experience.

28 Claims, 17 Drawing Sheets

Related U.S. Application Data continuation of application No. 13/900,664, filed on May 23, 2013, now Pat. No. 9,348,608.

(60) Provisional application No. 61/815,434, filed on Apr. 24, 2013.

(51) Int. Cl.
  *G06F 9/455* (2018.01)
  *G06F 9/48* (2006.01)
  *G06F 9/50* (2006.01)

(56) References Cited

U.S. PATENT DOCUMENTS

| | | | |
|---|---|---|---|
| 7,317,761 B2 | 1/2008 | Lozhkin | |
| 7,366,246 B2 | 4/2008 | Walker et al. | |
| 7,369,485 B2 | 5/2008 | Halford et al. | |
| 7,403,505 B2 | 7/2008 | Yoon et al. | |
| 7,430,257 B1 | 9/2008 | Shattil | |
| 7,684,467 B2 | 3/2010 | Li et al. | |
| 7,929,937 B2 | 4/2011 | Koivunen et al. | |
| 7,987,432 B1 | 7/2011 | Grechishkin et al. | |
| 8,086,836 B2 | 12/2011 | Chong et al. | |
| 2005/0120346 A1 | 6/2005 | Sprigg | |
| 2005/0125513 A1 | 6/2005 | Lam et al. | |
| 2006/0195840 A1 | 8/2006 | Sundarrajan et al. | |
| 2006/0218549 A1 | 9/2006 | Hsu et al. | |
| 2007/0256073 A1 | 11/2007 | Troung et al. | |
| 2008/0040507 A1 | 2/2008 | Hsu et al. | |
| 2008/0134143 A1 | 6/2008 | Hoerentrup et al. | |
| 2008/0147705 A1 | 6/2008 | Bansal et al. | |
| 2008/0198948 A1 | 8/2008 | Tang | |
| 2008/0318544 A1* | 12/2008 | Wang | H03D 7/125 455/323 |
| 2009/0031396 A1 | 1/2009 | Jung et al. | |
| 2009/0119773 A1* | 5/2009 | D'Amore | G06F 9/5011 726/21 |
| 2009/0129493 A1 | 5/2009 | Zhang et al. | |
| 2009/0215390 A1 | 8/2009 | Ku et al. | |
| 2009/0279626 A1 | 11/2009 | Wang | |
| 2009/0287894 A1 | 11/2009 | Renno | |
| 2009/0290552 A1 | 11/2009 | Bertorelle | |
| 2009/0307540 A1 | 12/2009 | Razazian et al. | |
| 2009/0313620 A1 | 12/2009 | Sedukhin et al. | |
| 2010/0086074 A1 | 4/2010 | Chen et al. | |
| 2010/0142643 A1 | 6/2010 | Ueda et al. | |
| 2010/0202574 A1 | 8/2010 | Chen et al. | |
| 2010/0205274 A1 | 8/2010 | Gharabally et al. | |
| 2010/0235261 A1 | 9/2010 | Lloyd et al. | |
| 2010/0306773 A1 | 12/2010 | Lee et al. | |
| 2010/0319051 A1 | 12/2010 | Bafna et al. | |
| 2011/0296412 A1* | 12/2011 | Banga | G06F 9/5027 718/1 |
| 2012/0023194 A1 | 1/2012 | Ruiz-Velasco et al. | |
| 2012/0030672 A1 | 2/2012 | Zygmuntowicz et al. | |
| 2012/0036552 A1 | 2/2012 | Dare et al. | |
| 2012/0066679 A1 | 3/2012 | Pappas et al. | |
| 2012/0151479 A1 | 6/2012 | Kothari | |
| 2012/0303695 A1 | 11/2012 | Michel et al. | |
| 2013/0061222 A1* | 3/2013 | Hwang | G06F 9/45516 718/1 |
| 2013/0067089 A1 | 3/2013 | Synytskyy et al. | |
| 2013/0167135 A1 | 6/2013 | Neumann et al. | |
| 2013/0181867 A1* | 7/2013 | Sturdivant | G06Q 30/0241 342/368 |
| 2013/0191495 A1 | 7/2013 | Almstrand et al. | |
| 2013/0198734 A1 | 8/2013 | Biswas et al. | |
| 2013/0212559 A1 | 8/2013 | Lehtimaki et al. | |
| 2013/0227565 A1 | 8/2013 | Lee et al. | |
| 2013/0283400 A1* | 10/2013 | Schneider | G06F 21/572 726/30 |
| 2013/0326499 A1 | 12/2013 | Mowatt et al. | |
| 2013/0332991 A1 | 12/2013 | Rivera | |
| 2013/0346965 A1 | 12/2013 | Conlan et al. | |
| 2014/0007048 A1 | 1/2014 | Qureshi et al. | |
| 2014/0007122 A1* | 1/2014 | Udeshi | G06F 9/4893 718/103 |

OTHER PUBLICATIONS

Chen, Hou-Shin, et al., "Spectrum Sensing for OFDM Systems Employing Pilot Tones." IEEE Transactions on Wireless Communications, vol. 8, No. 12, Dec. 2009, pp. 5862-5870.

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Rui, Yun, "Frequency domain discrete fourier transform spread generalized multi-carrier system and its performance analysis." Computer Communications 32 (2009), pp. 456-464.

Ehringer, "The Dalvik Virtual Machine Architecture", 8 pages, (Mar. 2010).

Li, et al., "XVM: A Bridge Between XML Data and Its Behavior", pp. 155-163, (May 17-22, 2004).

* cited by examiner

SYSTEM AND METHOD FOR RF DIGITIZATION AND COLLECTION

RELATED APPLICATIONS

This application is a continuation of U.S. application Ser. No. 13/938,774 entitled "System and Method for RF Digitization and Collection", filed Jul. 10, 2013 and of U.S. application Ser. No. 13/900,664 entitled "App Space for RF Digitization System and Other Test Equipment", filed May 23, 2013, and claims the benefit of priority to U.S. Provisional Application No. 61/815,435 entitled "App Space for RF Digitization System and Other Test Equipment", filed Apr. 24, 2013. The entire contents of the above applications are incorporated by reference herein for all purposes.

BACKGROUND

Radiofrequency digitization and collection systems (i.e., RFDCSs) collect and store radiofrequency (RF) signals. Generally, the raw RF signals that the RFDCS captures may be of limited use to a user of the system. Often, the user may desire to manipulate the raw RF signal data or perform other transformations to convert the raw RF signal data into a more useful form, such as reducing noise or amplifying a desired signal. However, digital signal processing, especially when done in real time, or "on-the-fly", can place a substantial burden on (or even completely overwhelm) system resources. Thus, real-time digital signal processing risks overloading system resources and the loss or corruption of desired RF signal data.

Because of the complexity and risk of data loss, RFDCSs may not y offer users the ability to perform real-time, online digital signal processing. Such limitations restrict users to offline digital signal processing, thereby greatly increasing the user's effort to transform the raw RF signal data into a suitable form. This may also limit the immediate usefulness of collected RF data, especially in some instances in which the RF signal data is collected in the field.

SUMMARY

The various embodiments describe an RF digitization and collection system (RFDCS) and methods for implementing the RF digitization and collection system to manage an application storage and retrieval space (App Space), wherein the App Space includes applications (apps) that may perform various offline and/or real-time transforms of RF signals received, stored, or played back on the RFDCS. Also, in the various embodiments, the RFDCS may govern the system resources available to these apps while ensuring that the RFDCS's core system functions are not impacted by the execution of one or more of these apps in the App Space. Thus, the RFDCS may enable users to utilize real-time signal processing by running various specialized apps without compromising the RFDCS's core system function, thereby promoting dynamic "on-the-fly" transformation of raw RF signals without compromising the user's overall experience.

The various embodiments may also describe methods of presenting various apps to a user via customized displays. In an embodiment, a customized display may be specifically tailored to a particular application (app) and may include various user-interface features to enable a user to utilize the app's transform functionalities through an app-specific user interface. In another embodiment, the customized display may display visualizations or other representations of data the app generates on the RFDCS's display panel using the RFDCS's graphical output and control software.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "transform(s)" or "transformation(s)" are used interchangeably and refer to the modification, manipulation, or various other types of processing performed on a signal that changes the RF signal into a new form. For example, noise reduction, desired signal amplification, normalization, and various filters may be used to perform a transform on a signal to change the signal into a new form. In the various embodiments, transforms may be performed using various hardware and software components.

As used herein, the terms "app(s)" or "application(s)" are used interchangeably and refer to programs, code, processes, or operations stored on the RFDCS that, among other things, implement transforms on RF signals during any of the reception of the RF signals, storage of the RF signals, and playback of the RF signals. Also, as used herein, the term "App Space" refers to a collection of apps stored on the RFDCS that may be used to perform transforms of RF signals.

Figure 1:
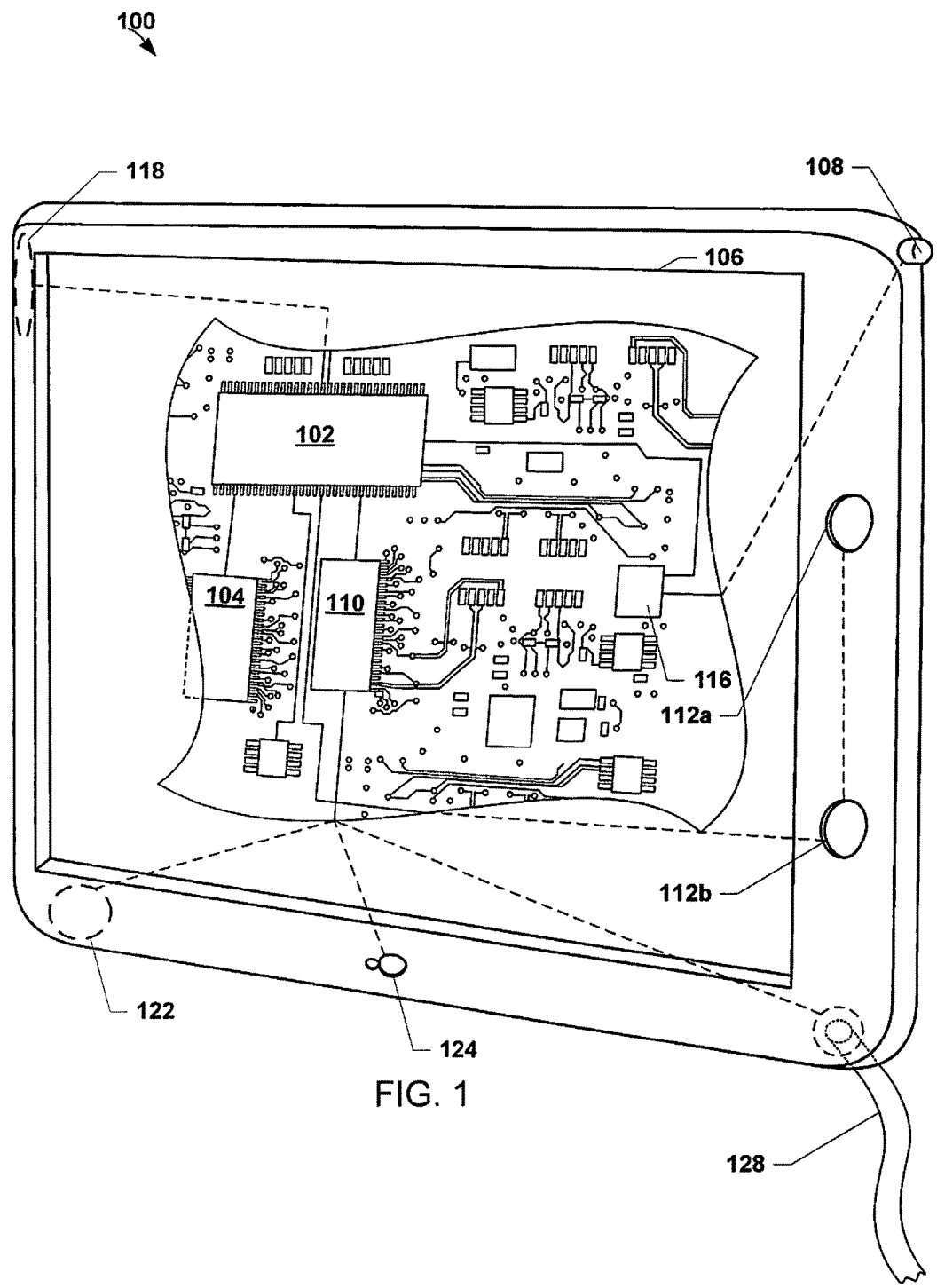
FIG. 1 is an illustration of an example RFDCS according to an embodiment.

The various embodiments may be implemented in various RFDCSs, an example of which is illustrated in FIG. 1. For example, the RFDCS 100 may include a processor 102 coupled to internal memory 104. Internal memory 104 may be volatile or non-volatile memory, and may also be secure and/or encrypted memory, or unsecure and/or unencrypted memory, or any combination thereof. The processor 102 may also be coupled to a touch screen display panel 106, such as a resistive-sensing touch screen, capacitive-sensing touch screen infrared sensing touch screen, or the like. Additionally, the display of the RFDCS 100 need not have touch screen capability. Additionally, the RFDCS 100 may have one or more antenna 108 for sending and receiving electromagnetic radiation (e.g., RF signals) that may be connected to a wireless data link and/or cellular telephone transceiver 116 coupled to the processor 102. In another embodiment, the RFDCS 100 may also receive and send RF signals over a wired RF connection 128, such as via a coaxial cable or other RF input/output feature. The RFDCS 100 may also include physical buttons 112a and 112b for receiving user inputs. The RFDCS 100 may also include a power button 118 for turning the RFDCS 100 on and off. Additionally, the RFDCS 100 may include a microphone 124 for receiving sound. The RFDCS 100 may also include a speaker 122 for converting audio signals into audible sound.

Figure 2:
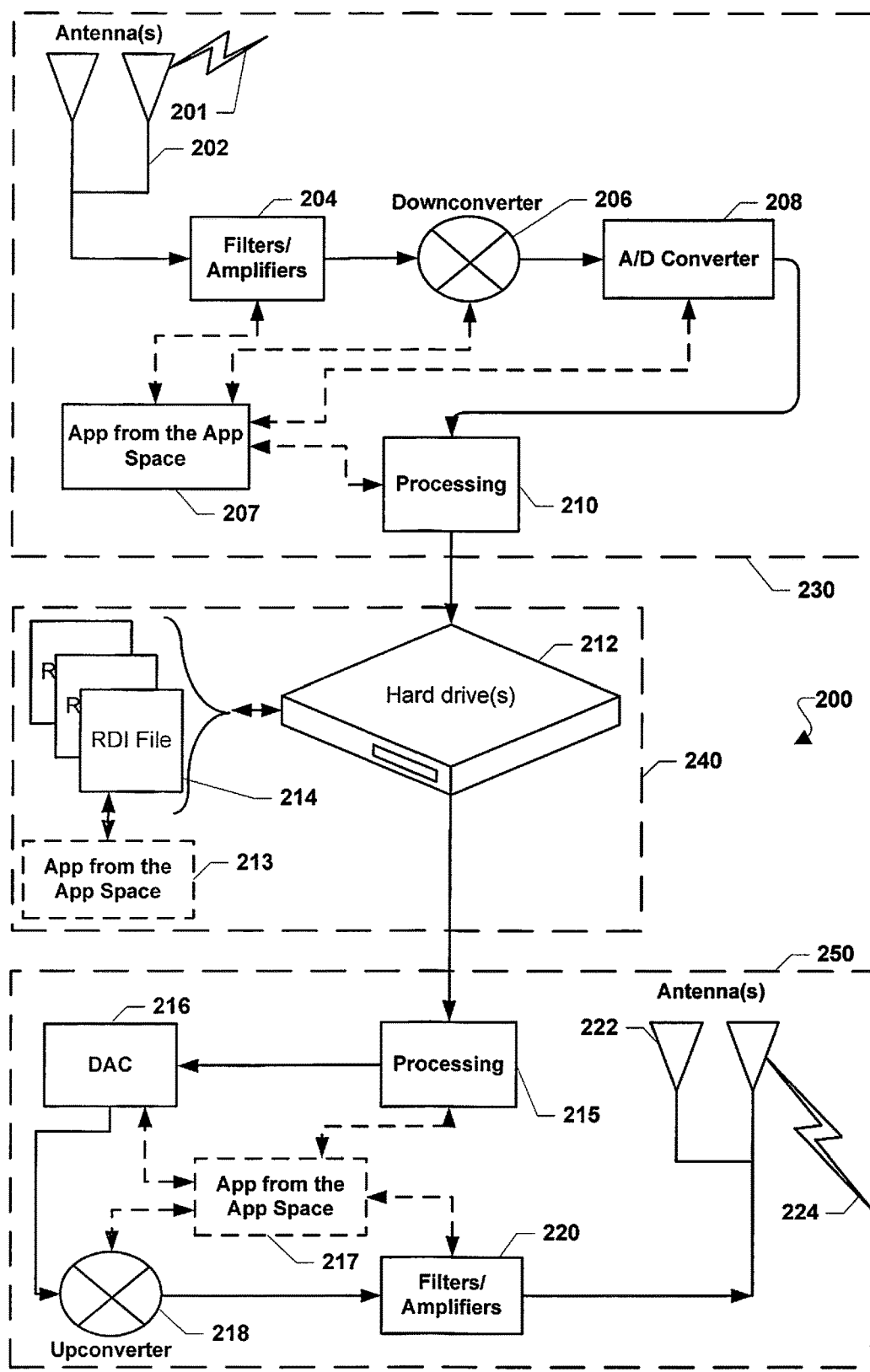
FIG. 2 is a block component diagram of an example RF digital recording, storing, and playback process according to an embodiment.

FIG. 2 is a component block diagram 200 illustrating three stages of RF signal processing on an embodiment RFDCS, respectively performed by a collection system 230, a data storage system 240, and a transmission system 250.

In an embodiment, a collection system 230 may receive RF signals. The collection system 230 may also include various components, such as a filters/amplifiers unit 204, a downconverter 206, an analog-to-digital converter (i.e., A/D converter 208), and a processing unit 210. The one or more antennas 202 may wirelessly receive an analog RF signal 201, such as a radio wave. In another embodiment (not shown), the collection system 230 may receive RF signals directly through a wired RF connection, such as a coaxial cable. The filters/amplifiers unit 204 (e.g., a high-pass filter unit) may filter and/or amplifying the captured analog RF signal 201. The filtered RF signal may be passed to a downconverter 206 and then to the A/D converter 208. The A/D converter 208 may use various techniques to convert the analog signal into a digital signal. After finishing converting the analog RF signal 201, the A/D converter 208 may pass the converted digital signal to a processing unit 210 for additional processing before the digital signal is sent for storage in the data storage system 240.

In an embodiment, any combination of the filters/amplifiers unit 204, the downconverter 206, the A/D converter 208 and the processing unit 210 may optionally implement transforms from an app 207 included in the App Space. In other words, the app 207 may operate on the RFDCS and cause any of the components 204, 206, 208, and 210 to apply various transforms to the analog RF signal 201 as it is converted from analog to digital. For example, the app 207 may cause the A/D converter 208 to apply various offsets and skewing algorithms that, among other things, may adjust the sampling rate of converted digital signals. In another example, the app 207 may decimate the analog RF signal 201 for easier processing and storage using the processing unit 210. In yet another example, the app 207 may configure the downconverter 206 and/or the filters/amplifiers unit to control frequencies of a received analog RF signal 201. Thus, various apps in the App Space may be utilized to apply transforms to signals throughout the collection process by directly modifying the behavior of any combination of the various components 204, 206, 208, and 210 of the collection system 230.

In an embodiment, the data storage system 240 may include a hard drive 212. Further, the hard drive 212 may maintain processed digital signals in the form of RF digital information (RDI) files 214. RDI files 214 may contain digital representations of received RF signal information. In an embodiment, the contents of a "RF Digital Information (RDI)" file may be in many formats, but may generally include an in-phase amplitude measurement of the signal (I) and generally (but not necessarily) also a 90 degree phase-shifted amplitude measurement of the signal (Q). Additional "meta data" that specifics pertinent information about the RDI files 214 construct may also be present in RDI files 214.

In another embodiment, an app 213 included in the App Space may optionally perform transformations on the digital signal stored in the RDI files 214. For example, the app may increase the signal's gain or may apply other filters, effects, and other transforms. In another embodiment, the app 213 may combine multiple RDI Files into a resulting RDI File for use by adding the signals together with or without additional signal manipulation. In another embodiment, the app 213 may apply other transforms typical of offline signal processing (i.e., computationally intensive signal processing that may not be practical to implement in real time). The hard drive 212 may send the digital signal stored in the RDI files 214 to the transmission system 250 for playback.

The transmission system 250 may include a processing unit 215 a digital-to-analog converter (DAC 216), an upconverter 218, a filters/amplifiers unit 220, and one or more antennas for transmitting an analog signal 224. In preparation for playback, a processing unit 215 may process the digital signal received from the hard drive 212 using various known techniques. In one embodiment, the processing unit 210 and the processing unit 215 may be the same processing unit (e.g., a central-processing unit (CPU) or a digital signal processor (DSP). In another embodiment, the processing units 210, 215 may be separate components (e.g., the processing unit 210 may be a DSP and the processing unit 215 may be a CPU). In yet another embodiment, the processing units 210, 215 may be one or more cores in one or more multi-core processing units, such as a quad- or dual-core DSP.

The processing unit 215 may send the processed digital signal to the DAC 216. The DAC 216 may convert the digital signal into an analog signal. After converting the digital signal, the DAC 216 may send the converted digital signal to an upconverter 218, which may apply various other transforms to the converted analog signal before sending the converted analog signal to a filters/amplifiers unit 220. The filters/amplifiers unit 220 may apply additional transforms to the converted analog signal and may send the converted analog signal to the antennas 222 for transmission as an analog signal 224. In another embodiment (not shown), the transmission system 250 may transmit the converted analog signal through a wired RF connection, such as a coaxial cable.

In an embodiment similar to the one discussed above with reference to the collection system 230, any combination of the processing unit 215, DAC 216, upconverter 218, and filters/amplifiers unit 220 may optionally implement transforms using an app 217 included in the App Space. The transforms stored in the app 217 employed may be varied and may change various characteristics of the analog signal processed by any combination of the processing unit 215, DAC 216, upconverter 218, and filters/amplifiers unit 220 in the transmission system 250.

Thus, in the various embodiments, apps 207, 213, 217 included in the App Space may perform various transforms during the various stages of signal processing. Particularly, the apps 207, 213, 217 may respectively apply transforms in the systems that manage particular aspects of the signal processing, such as the collection system 230, the data storage system 240, and the transmission system 250. In some embodiments, the apps may perform transforms on the RF signals without affecting the raw or original RF signal data. In other embodiments, the apps may not preserve the original RF signal data when applying transforms.

Figure 3A:
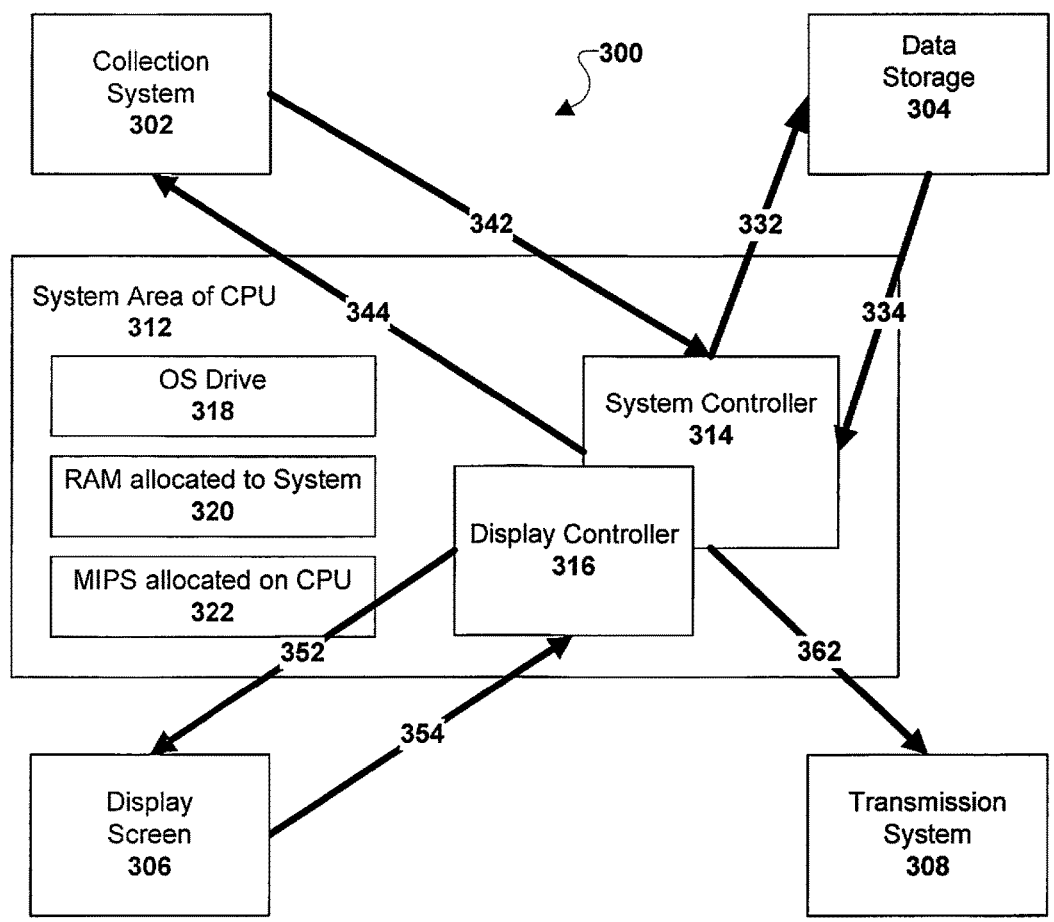
FIG. 3A is a system diagram of an example RFDCS according to an embodiment.
Figure 3B:
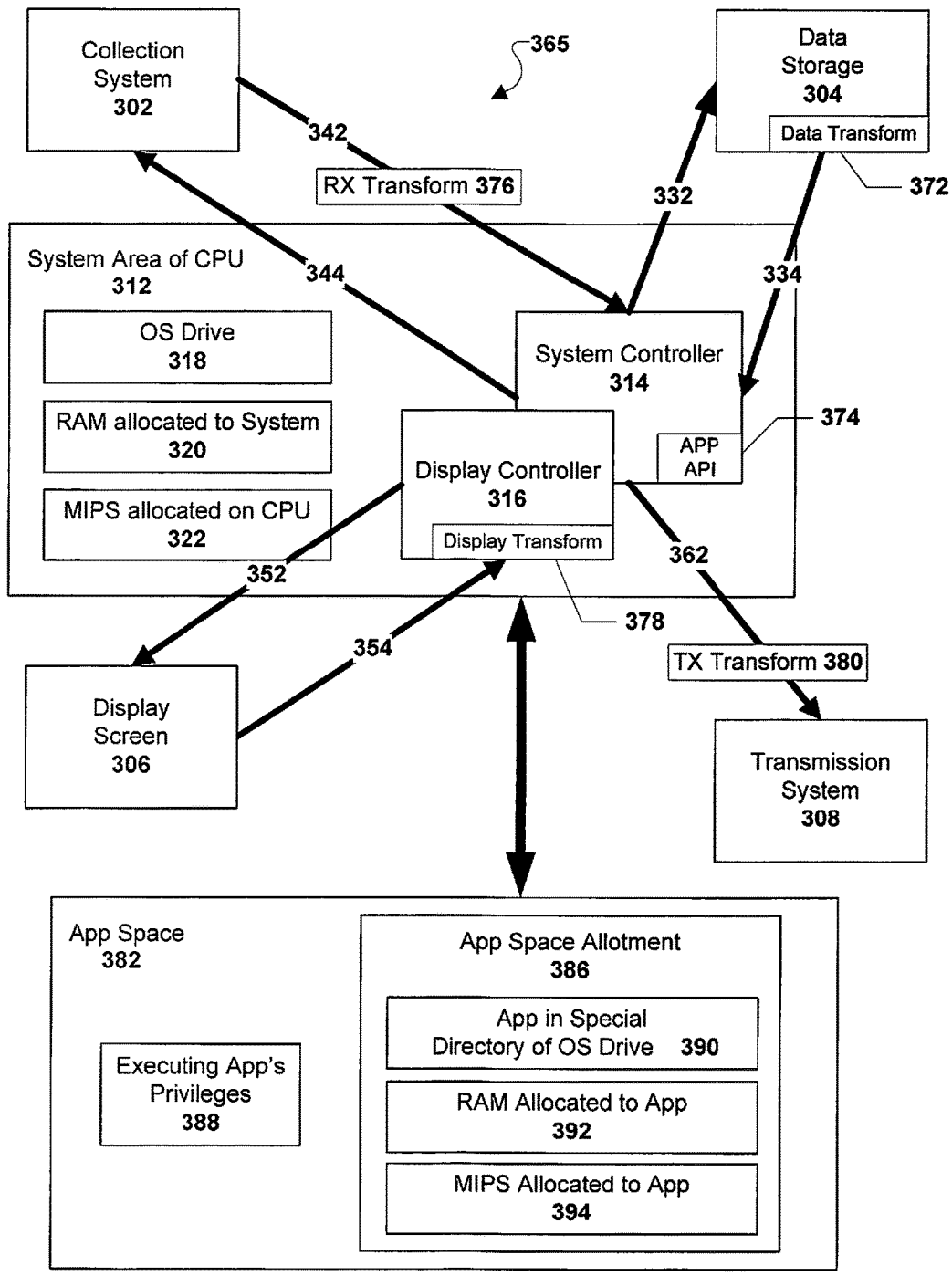
FIG. 3B is a system diagram of an example RFDCS that includes an App Space according to an embodiment.

FIGS. 3A-3B illustrate system diagrams 300, 365 for managing signal processing on embodiment RFDCSs.

FIG. 3A illustrates multiple systems included on an embodiment RFDCS. In an embodiment, the RFDCS may include a system area 312 of the central processing unit (CPU), which may have a higher priority/security than other systems included in the RFDCS. The system area 312 may include an operating system drive (OS Drive 318), which may function as a typical high-level operating system and may interact with and manage various hardware and software systems included in the RFDCS. The system area 312 may also include records 320, 322 indicating the random access memory (RAM) and MIPS, respectively, allocated to the system area 312. The system area 312 may also include a display controller 316 used for operating a display screen 306.

In an embodiment, the system area 312 may also include a system controller 314 that may coordinate and manage the operations of a collection system 302, a data storage system 304, and a transmission system 308. The system controller 314 may send various signals 344 to the collection system 302, including command and control signals. The collection system may function similarly to the collection system 230 described above with reference to FIG. 2 and may include a raw in-phase, quadrature-phase signal generator for converting an analog signal to a digital signal.

In a further embodiment, the system controller 314 may include one or more processing cores (not shown). The system controller 314 may utilize the one or more processing cores to implement apps within the App Space or to control and/or transform various aspects of the RFDCS, such as RF signal collection, storage, and playback. The system controller 314 may allocate specific resources—such as specific processing units, cores, and/or other resources—to one or more apps in the App Space. For example, at least one core may be dedicated to an app performing transforms on (i.e., processing) RF signals being collected with the collection system 230 while the core system functions utilize the other cores to ensure consist and reliable performance of various other components of the RFDCS. Thus, in an embodiment, the system controller 314 may leverage the one or more cores to perform real-time processing in a non-real-time system.

In another embodiment, the collection system 302 may send raw IQ data 342 to the system controller 314, which may send a signal 332 that includes the raw IQ data 342 to the data storage system 304. The signal 332 may also be sent using the VITA Radio Transport (VRT) standard.

In yet another embodiment, the data storage system 304 may be similar to the data storage system 240 described above with reference to FIG. 2. The data storage system 304 may store the signal 332 as an RDI file in various storage devices, such as a hard drive or solid state drive. Additionally, the data storage system 304 may include larger data storage space via eSATA, USB or other high data rate bus storage. The data storage system 304 may also send the stored signal back to the system controller 314 in a signal 334.

In another embodiment, the system controller 314 may send a signal 362 to a transmission system 308, which may be analogous to the transmission system 250 described above with reference to FIG. 2. The signal 362 may also include raw IQ data and command and control signals. The transmission system 308 may include a raw IQ transmitter for transmitting signals.

In another embodiment, the system controller 314 may be in communication with the display controller 316. The system controller 314 may send various instructions to the display controller to affect what is displayed on a display screen 306. For example, the display controller 316 may send a signal 352 including an instruction to draw a particular image, and the display screen may send a return signal 354 that includes a user's command control (i.e., a user's input when the display screen implements touchscreen capabilities).

In the various embodiments, as illustrated in FIG. 3B, a RFDCS may include components in additions to those described above with reference to FIG. 3A. These additional components may facilitate the incorporation of an App Space 382 in communication with the system area 312 and the implementation of apps in the App Space 382 to perform various transforms on signals in various systems operating on the RFDCS.

In an embodiment, the App Space 382 may have a lower security/priority than the system area 312 in order to protect the core system functions performed in the system area 312. In other words, the App Space 382 may be held in a separate and secure area that cannot interfere with the core system functions in the system area 312, thus protecting the integrity and security of the core system functions. Any apps executing on the RFDCS may also be confined to this separate and secure space for similar reasons.

The App Space 382 may include a record 388 of one or more executing apps' privileges. For example, the App Space 382 may maintain that a particular app has collection system control access privileges, thereby allowing the particular app to apply transforms during the RF signal collection process in the collection system 302. The App Space 382 may also include a record 386 of the App Space allotment. The record 386 may indicate where the apps are stored (i.e., the app location 390), the memory available to the apps (i.e., allocated RAM 392), and the MIPS allocated to the apps (i.e., allocated MIPS 394). Thus, in an embodiment, the App Space 382 may manage apps and their available resources.

In another embodiment, the system controller 314 may include an app application programming interface (i.e. app API 374). The app API 374 may include various libraries, functions, system calls, etc. that may allow the apps in the App Space 382 to perform transforms in various systems or various stages of signal processing. In a further embodiment, the app API 374 may enable an app to perform transforms of signals that the collection system obtains (i.e., Rx transforms 376), for example, by allowing the app to affect how the A/D converter 208 operates in FIG. 2. In another embodiment, using the app API 374, the app may apply data transforms 372 in the data storage system 304 by performing offline/post-processing of the signal while the signal is stored in an RDI file. Similarly, the app may perform transforms to signals during play back (i.e., Tx transforms 380).

In another embodiment, the app may use the app API 374 to communicate with the display controller 316 to perform various display transforms 378. Display transforms 378 may include displaying various app-specific items on the display screen 306, such as customized user interfaces, overlays, etc. For example, an app may cause an app-specific user interface to be displayed on the display screen 306 for use by the user.

In yet another embodiment, the App Space 382 may use the app API 374 to display a navigable, interactive display on the display screen. Such a display may feature the one or more apps included in the App Space 382 and may enable a user to browse and select the apps included in the App Space 382 for execution on the RFDCS.

Figure 4:
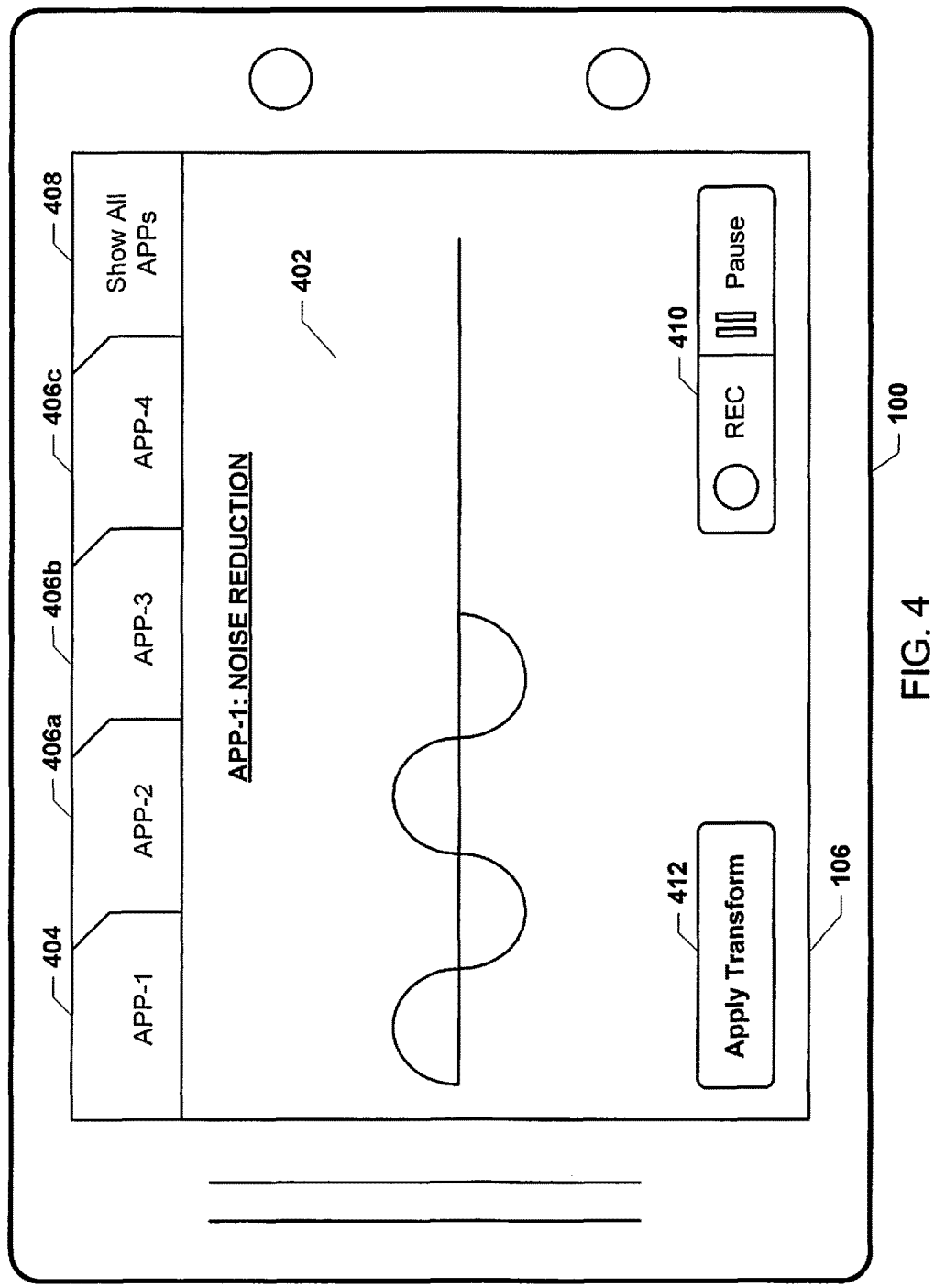
FIG. 4 is an illustration of an example RFDCS displaying app-specific displays according to an embodiment.

FIG. 4 illustrates an embodiment RFDCS displaying an app-specific user interface.

A display panel 106 of an RFDCS 100 may include various app-specific user interfaces. In an embodiment, when an app in the App Space is successfully launched, an app-specific user interface 402 associated with the launched app may be displayed on the display panel 106. For example, if a noise reducing app (i.e., APP-1 404) is successfully launched, the display panel 106 may display the app-specific user interface 402 associated with the noise-reducing app. The app-specific user interface 402 may include various visualizations, displays, graphics, texts, and other imagery. The app-specific user interface 402 may also include features with which the user may interact, such as real or virtual knobs, buttons, sliders, radio buttons, scroll bars, etc. For example, the app-specific user interface 402 may display a record button 410 that the user may select to begin recording RF signals. The app-specific user interface 402 may also include other buttons or features, such as an "apply transform" button 412 which, in this example, may apply noise-reducing filtering of an RF signal being recorded.

In another embodiment, the display panel 106 may include a navigation bar or other feature (e.g., the "Show All APPs" tab 408) that enables a user to browse and select various apps included in the App Space. In one embodiment, multiple apps may be operating on the RFDCS simultaneously, but only one app may be "featured" on the display panel 106. As illustrated in FIG. 4, APP-1 404 is featured as evidenced by its tab being highlighted in the navigation bar. In yet another embodiment, the display panel 106 may enable the user to switch which app is featured (i.e., which app's app-specific user interface is displayed). For example, the user may select any one of the other apps in the navigation bar by selecting, for example, the APP-2 tab 406a, the APP-3 tab 406b, or the APP-4 tab 406c.

Thus, in various embodiments, an app may utilize the app API 374 as discussed above with reference to FIG. 4 to present a fully customizable user interface on the display panel 106 for displaying features specific to that app.

Figure 5:
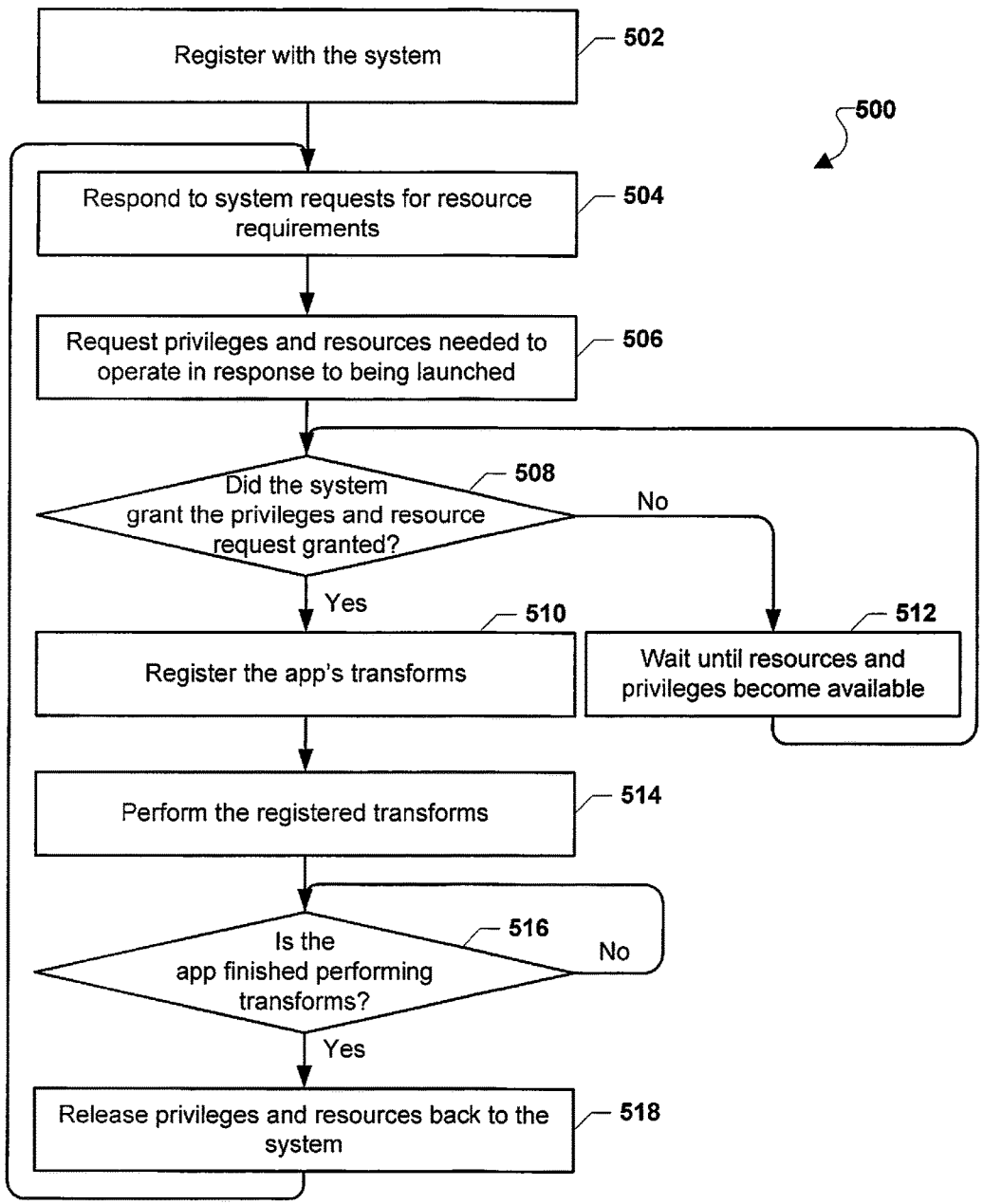
FIG. 5 is a process flow diagram illustrating an embodiment method for performing transforms with an app operating on an RFDCS.

FIG. 5 illustrates an embodiment method 500 that may be implemented by an app operating on an RFDCS to perform transforms. The app may begin performing method 500 by registering with the system in block 502. In an embodiment, the system may be the system controller 314 or some other aspect of the system area 312 as discussed above with reference to FIGS. 3A and 3B. Registering with the system may include requesting approval from the system to be added to a list of approved applications accessible to the user, (e.g., the App Space). In another embodiment, registering with the system may include moving the app to a folder or location on in the RFDCS's file system.

In block 504, the app may respond to system requests for resource requirements. In an embodiment, the system may request various types of information about the app, including description information and the app's resource and privileges' requirements. Responding to the system's requests is described below with reference to FIG. 6.

In block 506, the app may request privileges and resources the app may need to operate in response to being launched. In an embodiment, the app may request certain allocations of memory and other system resources, as well as privileges to access/control other components of the RFDCS, such as the transmission system or the collection system. In another embodiment, the app may be launched locally (e.g., a local operator may select the app on the RFDCS to launch), or the app may be launched remotely (e.g., a remote operator at a home base may send a remote signal to the RFDCS to launch the app). In determination block 508, the app may determine whether the system granted the app's privileges and resources request. Requesting privileges and resources from the system is described below with reference to FIGS. 6 and 7.

If the app determines that the system did not grant the privileges and resources request (i.e., determination block 508="No"), the app may wait until resources and privileges become available in block 512. The app may continue performing in determination block 508. Otherwise, if the app determines that the system granted the privileges and resources request (i.e., determination block 508="Yes"), the app may register its transforms in block 510. Registering the app's transformations is described in detail below with reference to FIG. 9.

In block 514, the app may perform the registered transforms. In various embodiments, the app may perform registered transforms by altering RF signal data during various stages of handling the RF signal data (e.g., during its collection, storage, or playback). Performing transformations is described below in further detail with reference to FIG. 10.

In determination block 516, the app may determine whether it is finished performing transforms. For example, the user may have closed the app, or the app may have traveled outside of the geographic area in which it was designated to operate. If the app determines that it is not finished performing transforms (i.e., determination block 516="No"), the app may continue performing in determination block 516. Otherwise, if the app determines that it is finished performing transforms (i.e., determination block 516="Yes"), the app may release its privileges and resources back to the system in block 518. For example, the app may release its privileges to the transmission system and release its access to memory. Releasing privileges and resources back to the system is described below with reference to FIG. 11. The app may continue performing in block 504.

Figure 6:
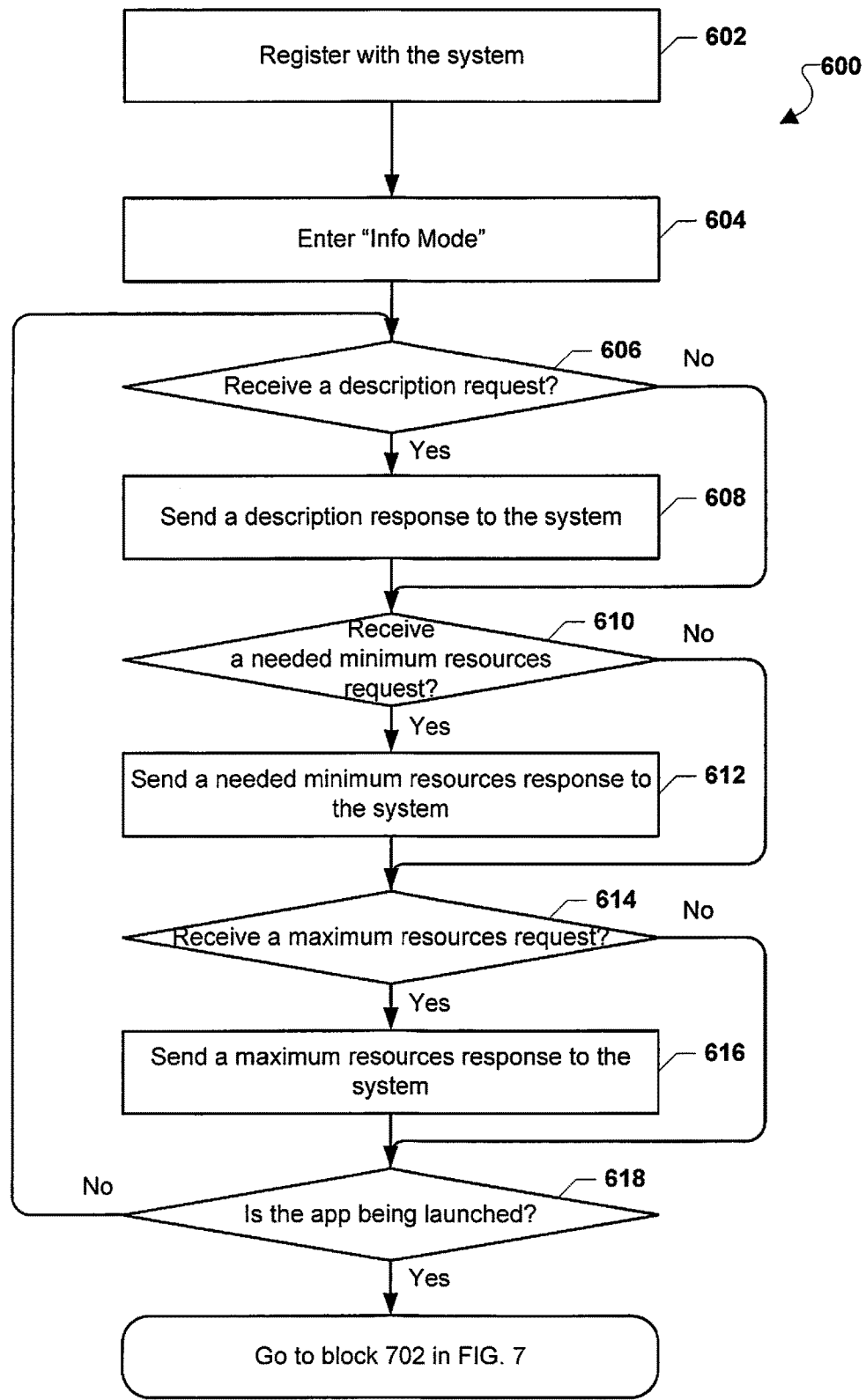
FIG. 6 is a process flow diagram illustrating an embodiment method for responding to requests while an app is in "Info Mode."

FIG. 6 illustrates an embodiment method 600 that may be implemented by an app operating on an RFDCS. The app may begin performing method 600 by registering with the system as described above with reference to block 502 of method 500 in FIG. 5.

After registering with the system, the app may enter "Info Mode" in block 604. In an embodiment, an app in "Info Mode" may be limited to responding to requests from the system for various types of information as discussed with reference to FIG. 14. In other words, an app in "Info Mode" may operate in a reduced capacity, during which time the system may determine the operating requirements and privileges the app may need to operate minimally and/or ideally on the RFDCS.

In determination block 606, the app may determine whether it has received a description request from the system. In an embodiment, the system may request information from the app in which the system may use to describe the app. For example, the system may request the app's name and the app's intended purposes, which the system may later display on the RFDCS's display in the app's app-specific user interface for the user to see. If the app determines that it has received a description request from the system (i.e., determination block 606="Yes"), the app may send a description response to the system in block 608. In an embodiment, the description may be a Unicode string and/or XML string with one or more of the app's title, description, purpose, etc. The app may continue operating in determination block 610. However, if the app determines that it has not received a description request from the system (i.e., determination block 606="No"), the app may continue performing in determination block 610.

In determination block 610, the app may determine whether it has received a needed-minimum-resources request from the system. If the app determines that it has received a needed-minimum-resources response from the system (i.e., determination block 610="Yes"), the app may send a needed-minimum-resources response to the system in block 612. In an embodiment, the app may inform the system about the minimum system resources that would allow the app to function on the RFDCS, such as the minimum amount of memory the app will need when running at its lowest capacity. The app may also inform the system of the minimum privileges it will need to operate at its lowest capacity, such as the hardware on the RFDCS that the app may need for its base functions. The app may continue performing in determination block 614.

However, if the app determines that it has not received a needed minimum resources request (i.e., determination block 610="No"), the app may determine whether it has received a maximum resources request in determination block 614. In an embodiment, the maximum resources request may include requests asking for the systems resources the app would need to operate at peak or full capacity. For example, the app may have additional functionalities that it may employ when it has access to a sufficient amount of system resources (e.g., more complicated transforms when more memory is available). If the app determines that it has received a maximum resources request (i.e., determination block 614="Yes"), the app may provide a maximum resources response to the system. In an embodiment, this response may include the various system resources the app requires to operate fully or to use all of its capabilities. The app may continue performing in determination block 618.

Otherwise, if the app determines that it has not received a maximum resources request (i.e., determination block 614="No"), the app may determine whether it is being launched in determination block 618. In an embodiment, the app may be launched in response to receiving user input on the user interface instructing the RFDCS to launch the app. For example, the user may click or touch an icon displayed on the RFDCS's display that represents the app. In another embodiment, the app may be launched via a remote interface. For example, from a home base, an administrative device operated by an engineering supervisor may launch the app remotely on an RFDCS in the field. In yet another embodiment, the app may be launched based on a schedule or at startup of the RFDCS. The app may also be launched based on a global-positioning satellite position (GPS) location. For example, the app may utilize geo-fencing.

If the app determines that it is being launched (i.e., determination block 618="Yes"), the app may request privileges it needs to start as further described with reference to block 702 in FIG. 7.

Otherwise, if the app determines that it is not being launched (i.e., determination block 618="No"), the app may continue performing in determination block 606. In other words, the app may remain in "Info Mode" and may continue responding to requests from the system until the app detects that it is being launched.

Figure 7:
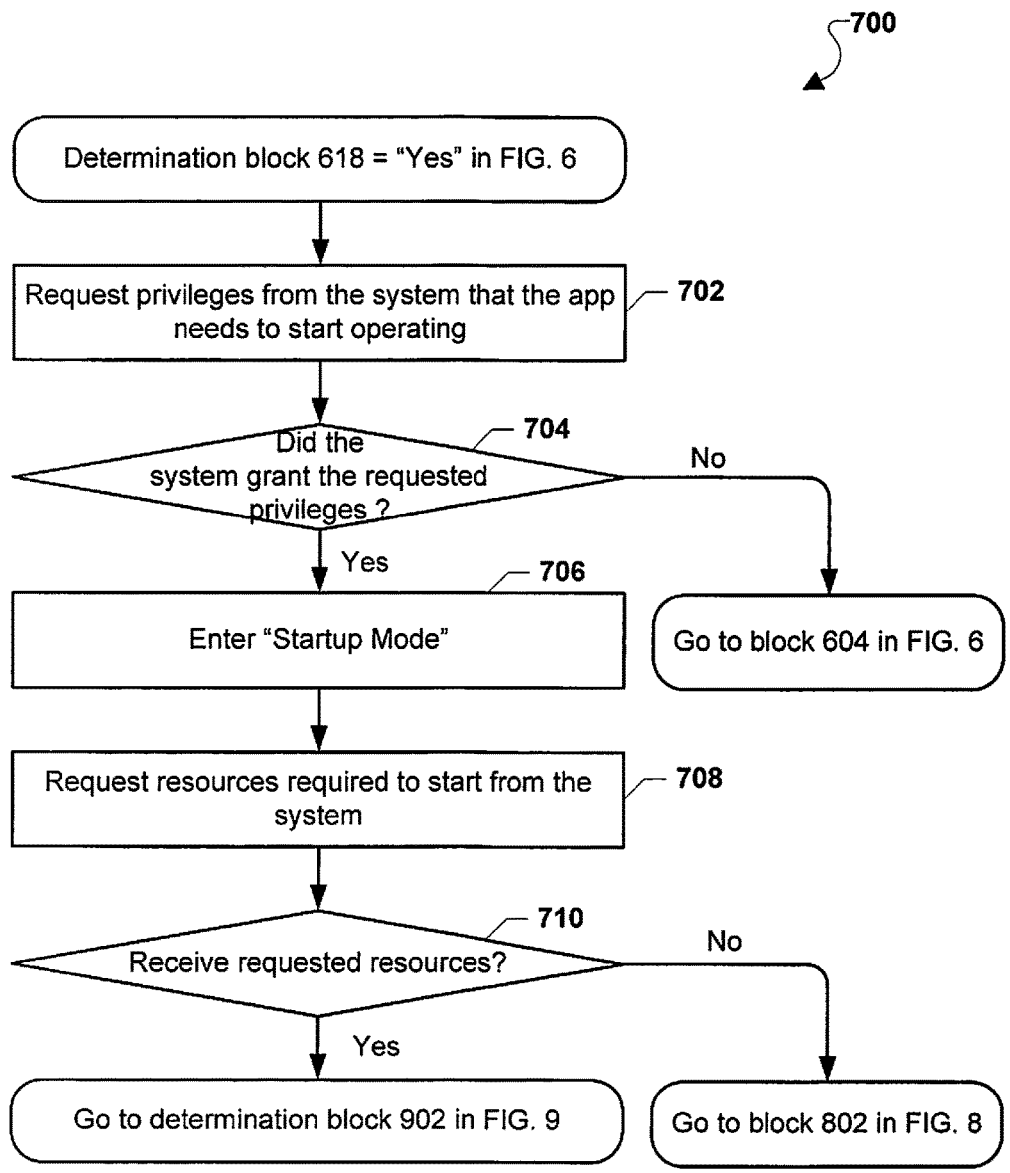
FIG. 7 is a process flow diagram illustrating an embodiment method for performing "Startup Mode" operations on an app.

FIG. 7 illustrates an embodiment method 700 that may be performed by an app operating on an RFDCS for entering a "Startup Mode." The app may begin performing method 700 when it determines that it is being launched (i.e., determination block 618="Yes" in FIG. 6).

In block 702, the app may request privileges from the system that the app needs to start operating. In an embodiment, these privileges may include collection system control privileges, transmission system control privileges, data storage access privileges, display access privileges, hardware access privileges, and various transform privileges. For example, an app designed to perform frequency sweeping operations may request hardware access privileges to change the frequency monitored on the RFDCS's transceiver.

In determination block 704, the app may determine whether the system granted the app's privilege requests. In an embodiment, the system may grant the app's privilege requests when resources (e.g., hardware resources) are available. The system may use various other criteria to determine whether to grant the app's privileges requests. If the app determines that the system did not grant its privilege requests (i.e., determination block 704="No"), the app may continue performing by entering "Info Mode" in block 604 as described with reference to FIG. 6. In other words, even after receiving a launch attempt, the app may not enter "Startup Mode" unless the system grants privileges to the app that the app needs to operate.

Otherwise, if the app determines that the system did grant the app's privilege requests (i.e., determination block 704="Yes"), the app may enter "Startup Mode" in block 706. In an embodiment, entering "Startup Mode" may cause the app to begin attempting to obtain the resources it needs to begin operating on the RFDCS. In block 708, the app may request resources required for it to start from the system. These resources may include memory, MIPS, and various other system resources allotments that the app may require to operate.

In determination block 710, the app may determine whether it has received the requested resources. In an embodiment, the system may allocate the requested resources to the app when there are sufficient system resources. If the app determines that it has received the requested resources (i.e., determination block 710="Yes"), the app may continue performing in "Starting Mode" by determining whether it has registered all of its transforms in determination block 902 in FIG. 9. Otherwise (i.e., determination block 710="No"), the app may continue performing in "Suspended Mode" by indicating its required resources in block 802 in FIG. 8.

Figure 8:
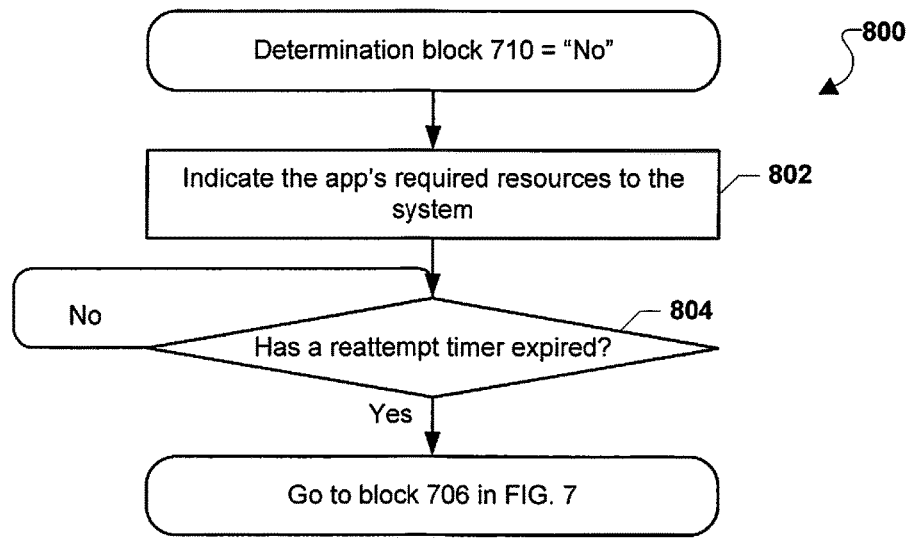
FIG. 8 is a process flow diagram illustrating an embodiment method for implementing a "Suspended Mode" on an app.

FIG. 8 illustrates an embodiment method 800 that may be performed by an app operating on an RFDCS while in "Suspended Mode." In an embodiment, a launched app that does not receive its minimum required allotment of system resources may be placed in a "Suspended Mode," in which the suspended app functions at a reduced capacity, similar to the app's performance while in "Info Mode." In a further embodiment, the app's reduced capacity may include responding to messages from the system or other responsive or passive operations.

In block 802, the app may indicate its required resources to the system. In an embodiment, by indicating its required resources to the system, the app may alert the system to what system resources must become available before the app will be able to operate. For example, if the app needs 256 megabytes of system memory to function in a minimum capacity, the app may inform the system that it is waiting for 256 megabytes of memory to be freed before it can operate.

In determination block 804, the app may determine whether a reattempt timer has expired. In an embodiment, the reattempt timer may be a measure of time in which the app must wait before it reattempts to acquire the system resources it needs to function. If the app determines that the reattempt timer has not expired (i.e., determination block 804="No"), the app may continue performing in determination block 804. Otherwise, if the app determines that the reattempt timer has expired (i.e., determination block 804="Yes"), the app may continue performing by entering "Startup Mode" in block 706 in FIG. 7. In an embodiment, the app may continue to cycle from "Startup Mode" to "Suspended Mode" until the resources the app needs to operate are available (e.g., after the user closes other apps, thereby freeing system resources).

Figure 9:
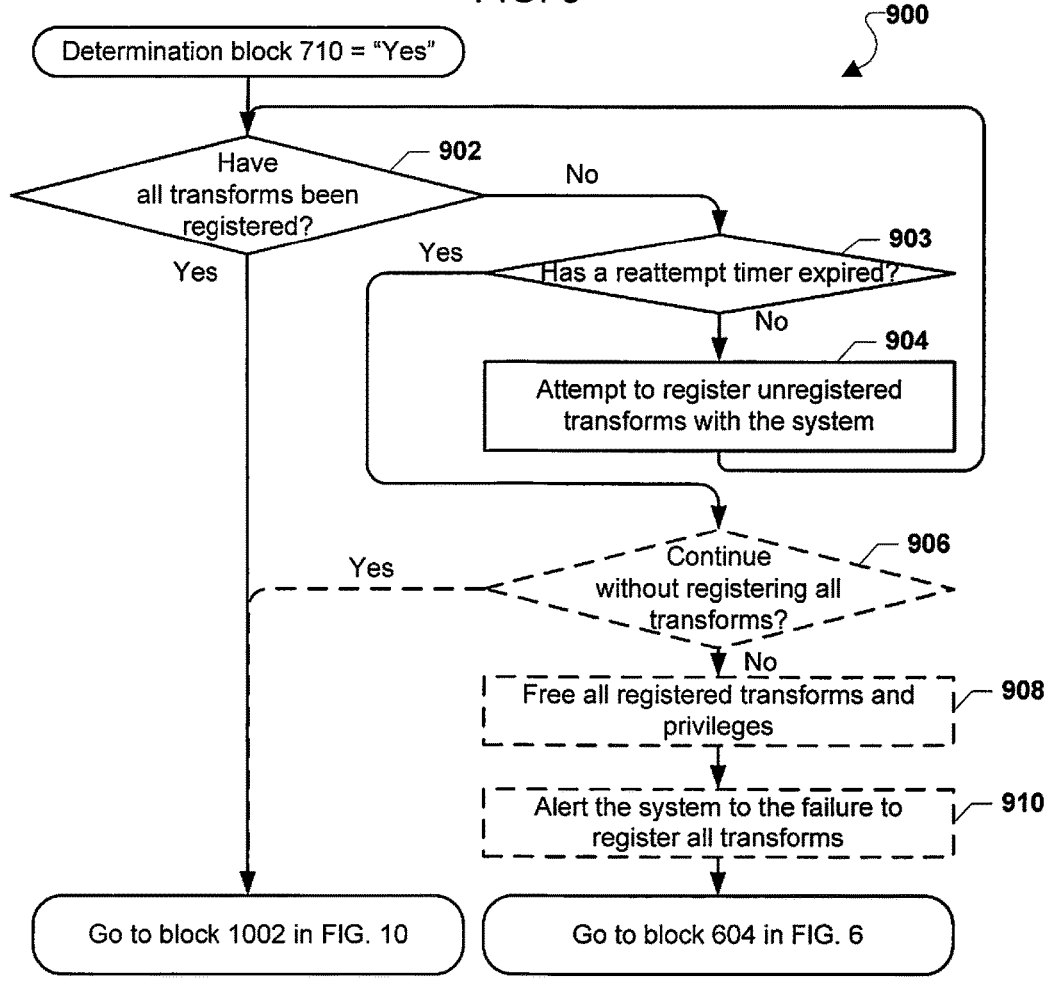
FIG. 9 is a process flow diagram illustrating an embodiment method for registering transforms from an app in "Starting Mode."

FIG. 9 illustrates an embodiment method 900 that may be performed by an app operating on an RFDCS while in "Starting Mode." In the various embodiments, an app in "Starting Mode" may have obtained the resources and privileges it needs to function on the RFDCS.

In determination block 902, the app may determine whether it has registered all of its transforms. In an embodiment, the app's transforms may include various mechanisms for transforming or processing RF signal data. If the app determines that it has not registered all of its transforms (i.e., determination block 902="No"), the app may determine in determination block 903 whether a reattempt timer has expired. In an embodiment, the app may only attempt to register unregistered transforms for a certain period of time. If the app determines that the reattempt time has expired (i.e., determination block 903="Yes"), the app may optionally determine whether to continue without registering all of its transforms in optional determination block 906. If the app optionally determines to continue without registering all of its transforms (i.e., optional determination block 906="Yes"), the app may enter "Running Mode" and begin performing transformations in block 1002 of method 1000 as described below with reference to FIG. 10. Otherwise, if the app optionally determines not to continue without registering all its transforms (i.e., optional determination block 906="No"), the app may free all of its registered transforms and privileges in optional block 908. The app may also alert the system to its failure to register all of its transforms in optional block 910. The app may continue performing by entering "Info Mode" in block 604 of method 600 as described above with reference to FIG. 6.

If the app determines that the reattempt timer has not expired (i.e., determination block 903="No"), the app may attempt to register its unregistered transforms with the system in block 904. The app may continue performing in determination block 902. In other words, the app may continue attempting to register its unregistered transform until the reattempt timer has expired.

Figure 10:
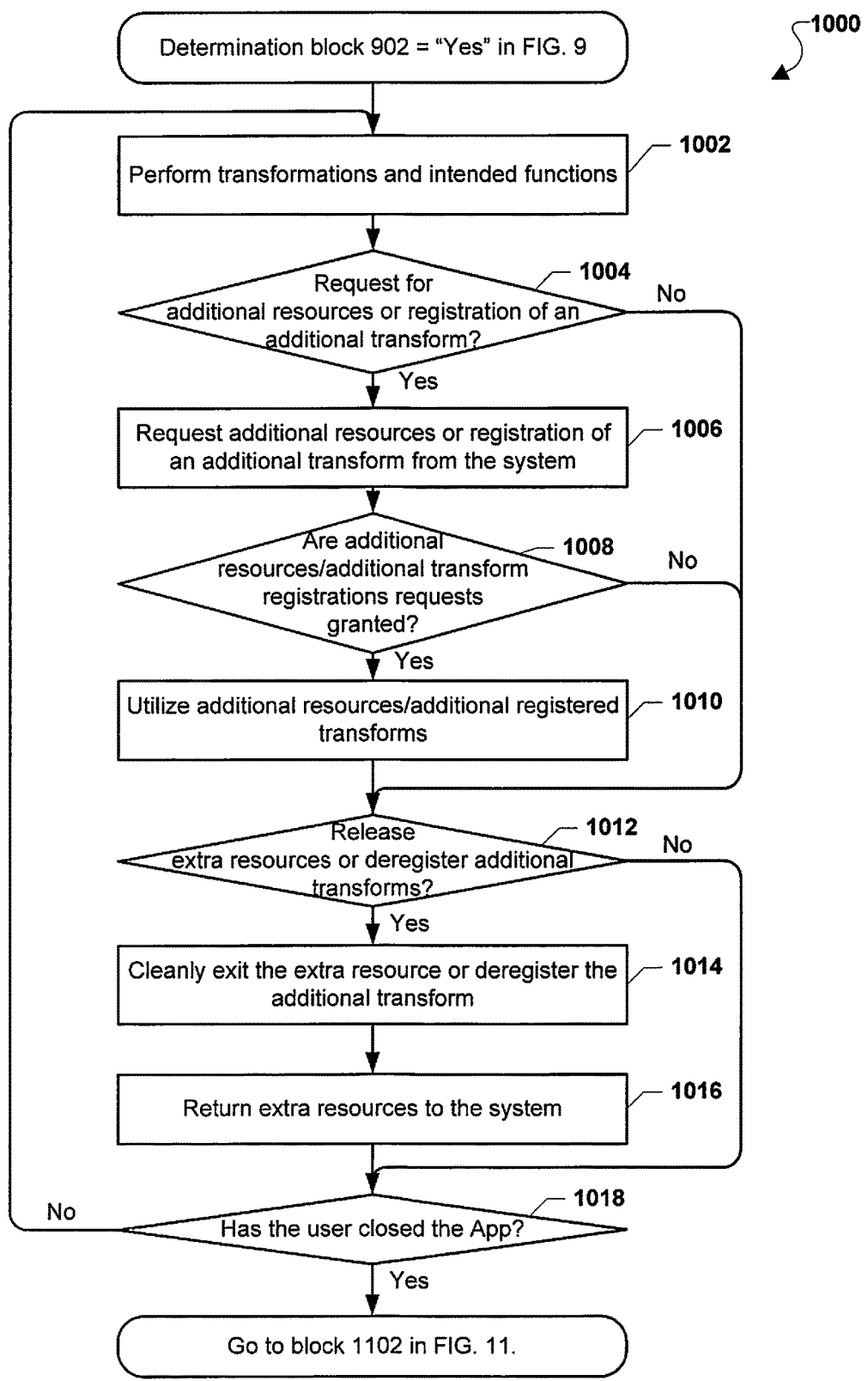
FIG. 10 is a process flow diagram illustrating an embodiment method for performing transforms on an app in "Running Mode."

Otherwise, if the app determines that all of its transforms have been registered with the system (i.e., determination block 902="Yes"), the app may continue performing in "Running Mode" by performing transformations in block 1002 in FIG. 10.

FIG. 10 illustrates an embodiment method 1000 that may be performed by an app operating on an RFDCS during "Running Mode." In various embodiments, an app in "Running Mode" (i.e., a "running app") may perform various transforms and other operations consistent with the app's purpose and capabilities. In an embodiment, an app may not begin performing a transform until the app enters "Running Mode."

In block 1002, the app may perform transformations and other intended functions. In an embodiment, transforms may include call back functionality. In such an embodiment, the app may provide call backs functions to the system in response to receiving one or more event notifications, such as a notification that new RF signal data is being received. In an example, the call back functions may cause one or more components of the RFDCS to transform a specific number of bytes of new RF signal data. In another example, the call back function may redirect memory pointers to a buffer that the app fills with modified data, thereby causing other system components to access the app's buffer instead of the original memory location. In this example, the app may cause other components to use transformed RF signal data in the app's buffer rather than the raw RF signal data stored in the original memory location.

In an embodiment, the system may begin all initially registered transforms at the same time. In a further embodiment, while in "Running Mode," the app may perform transformations and may respond to a user's inputs. For example, an app in "Running Mode" designed to serve as a software AM/FM radio may display various knobs, tuners, volume slides, etc. on the display of the RFDCS and respond to the user's inputs (e.g., adjusting the tuner to a different FM channel or increasing the volume).

In determination block 1004, the app may determine whether to request additional resources from the system or registration of an additional transform. For example, the app may have received its minimum required allotment of resources and may subsequently determine that its performance could be improved with additional resources. In another example, in response to various created transient data or the user's inputs, the app may determine to register a new transform according to the app's design and purpose, such as an additional smoothing noise reduction transform to be applied to the input feed. The app's determination may factor in the app's current resources, the availability of additional system resources, and the way in which the user is using the app (e.g., the user may only be using the app to perform low-complexity transforms). Also, as described above, the app may request additional resources or registration of an additional transform, inter alia, to improve its performance and/or capabilities. If the app determines not to request additional resources or registration of an additional transform (i.e., determination block 1004="No"), the app may continue performing in determination block 1012.

However, if the app determines to request additional resources or registration of an additional transform (i.e., determination block 1004="Yes"), the app may request additional resources or registration of an additional transform from the system in block 1006. The app may determine whether the system has granted the app the requested additional resources or the request additional transform registration in determination block 1008. In an embodiment, the app may dynamically adjust its performance based on whether additional resources or additional transform registrations requests are granted. If the app determines that additional resources or additional transform registrations requests were not granted to the app (i.e., determination block 1008="No"), the app may continue performing in determination block 1012.

Otherwise, if the app determines that additional resources or additional transform registrations requests were granted (i.e., determination block 1008="Yes"), the app may utilize the additional resources and/or additional registered transforms in block 1010. For example, if the app receives additional resources that would enable the app to perform additional transforms or otherwise enhance its capabilities, the app may begin utilizing those additional resources to perform enhanced operations. In another embodiment (not shown), the app may determine whether to utilize the additional resources once obtained from the system. In this embodiment, the app may not be designed to adjust its performance dynamically based on the resources it has available. In another embodiment in which the app's request for registration of an additional transform is granted, the app may apply the additional transform to the data as soon as the additional transform is registered, and the app may utilize the additional transform as specified by the app's purpose. Further, the app may be responsible for handling any transient data periods based upon the app's design and purpose.

The app may also determine whether to release extra resources or deregister additional transforms in determination block 1012. In an embodiment, after a period of time, the app may determine that its operations do not require the amount of system resources or the number of transforms that the system has allocated or registered to the app. For instance, the app may have been allocated a maximum or "ideal" amount of resources, but, in practice, the app does not require a maximum amount of system resources. In another example, the app may determine to deregister a transform that is no longer need and to resume normal operation. If the app determines not to release extra resources or deregister additional transforms (i.e., determination block 1012="No"), the app may continue operating in determination block 1018.

Otherwise (i.e., determination block 1012="Yes"), the app may cleanly exit the extra resources or deregister the additional transform in block 1014. In an embodiment, the system may not release the extra resources until the app cleanly exits those resources. The app may return the extra resources to the system in block 1016.

In determination block 1018, the app may determine whether the user has closed the app. For example, the user may have finished using the app to perform certain transformations on RF data and may close the app to free up resources for other apps operating on the RFDCS. If the app determines that the user has not closed the app (i.e., determination block 1018="No"), the app may continue performing in block 1002 by continuing to perform transformations and other intended functions. In other words, the app may continue in "Running Mode" until the user (or the system) closes the app. If the app determines that the user has closed the app (i.e., determination block 1018="Yes"), the app may continue performing in "Stopping Mode" in block 1102 in FIG. 11.

Figure 11:
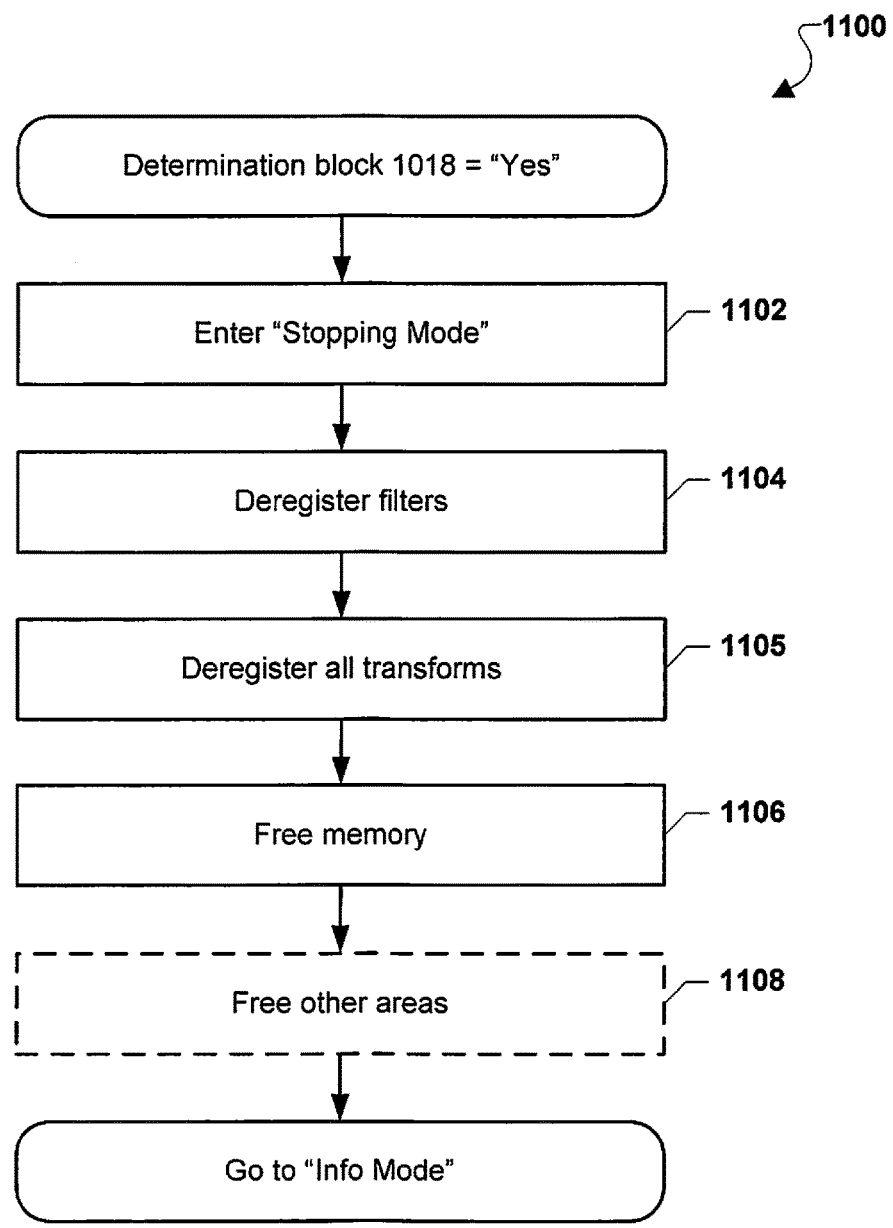
FIG. 11 is a process flow diagram illustrating an embodiment method for performing "Stopping Mode" operations on an app.

FIG. 11 illustrates an embodiment method 1100 that may be implemented by an app operating on an RFDCS while in "Stopping Mode." The app may begin performing the method 1100 by entering "stopping Mode" in block 1102. In an embodiment, an app may enter "Stopping Mode" by performing various steps to cease active operations on the RFDCS.

In block 1104, the app may deregister filters. The app may also deregister all transforms in block 1105. In an embodiment, all transforms may be stopped at the same time. The app may also free memory the system had allocated to the app in block 1106. For example, the system may have allocated 512 megabytes of memory for the app's use, and the app may release this memory for use by other entities operating on the RFDCS. In another embodiment, the app may optionally free other areas, such as pointers, data structures, etc., in optional block 1108.

The app may continue performing by entering "Info Mode" in block 604 in FIG. 6. Thus, in the various embodiments, once an app has finished operating, it may return to "Info Mode," where it may operate in a reduced capacity until it is launched again.

Figure 12:
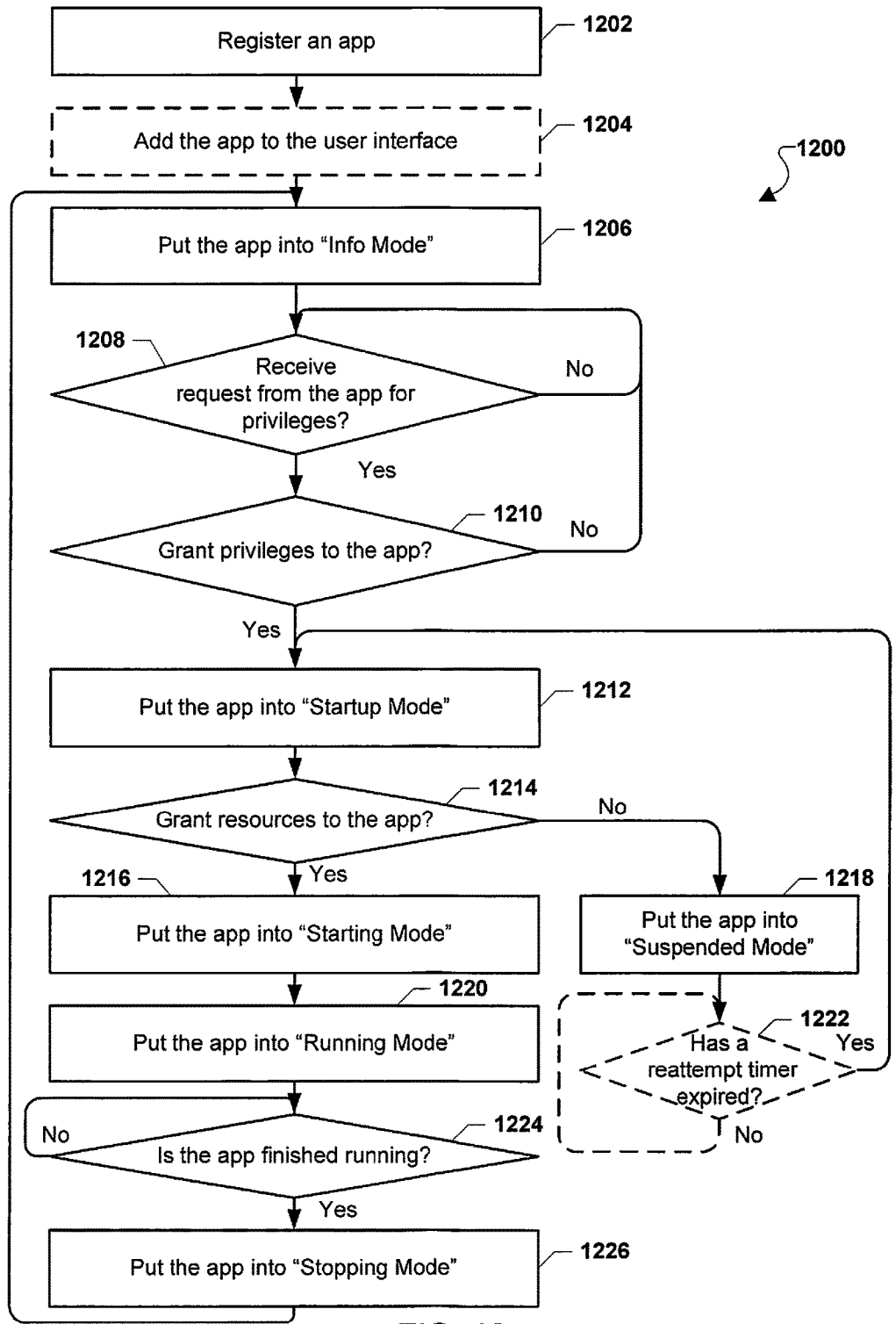
FIG. 12 is a process flow diagram illustrating an embodiment method for managing an app in the App Space.

FIG. 12 illustrates an embodiment method 1200 that may be implemented by a system operating on an RFDCS for managing the execution of an application.

In block 1202, the system may register the app. In an embodiment, registering an app may include adding the app to a list of apps approved to operate on the RFDCS. In some embodiments, the system may perform various scans, checks, or other verification methods to ensure that the app does not contain harmful content (e.g., malware, viruses, worms, etc.) and/or that the app is compatible with the RFDCS. For example, the system may determine whether the app utilizes an App Space application programming interface (API), which may define various mandatory and optional interfaces the app must implement to be used on the RFDCS. Registering an app is further discussed below with reference to block 602 in FIG. 6.

The system may also add the registered app to the user interface (UI) in optional block 1204. In an embodiment, an app may include a corresponding app-specific user interface for use with the application as discussed above with reference to FIG. 4. For instance, the app may include a display and various buttons, sliders, or other user-interaction elements for receiving input from a user. In another embodiment, the system may display multiple app-specific user interfaces (e.g., as tabs or as in a selectable list) and provide the user with the ability to scroll through or switch which UI is featured on the RFDCS's display.

The system may put the app into "Info Mode" in block 1206. Thus, in an embodiment, the RFDCS may allow the app to operate only to the extent necessary to retrieve resource requirement information, performance specifications, and other information the RFDCS may need to manage the app's operation. "Info Mode" is further discussed above with reference to block 604 in FIG. 6.

In determination block 1208, the system may determine whether there is a request from the app for privileges. In an embodiment, the system may receive input from the user to start the app. For example, while collecting raw RF signals, a user may select an icon representing the app on the RFDCS's display panel, thereby issuing a request to the RFDCS to begin that app. After being selected for launch, the app may request privileges from the system that the app may require to perform correctly. If the system does not receive a request for privileges from the app (i.e., determination block 1208="No"), the system may continue monitoring for a request to launch the app. In other words, the app may remain in "Info Mode" until there is a request to launch that app. Otherwise, if the system does receive a request for privileges (i.e., determination block 1208="Yes"), the system may receive a request from the app for privileges in determination block 1210.

In various embodiments, the system may manage various privileges among one or more apps. Such privileges may include a collection system control privilege, a transmission system control privilege, a data storage access privilege, and a display access privilege, receiver (Rx) transform privileges, transmitter (Tx) transform privileges, data transform privileges, hardware access privileges, and persistent storage access privilege, among others. In an embodiment, the collection system control privilege may be an exclusive privilege (i.e., granted to only one app at a time) and may allow the app to control the RFDCS's collection/reception hardware (e.g., tuners, bandwidth, data-rates, etc.). The transmission system control privilege may be another exclusive privilege that enables one app to control the RFDCS's transmission hardware. Similarly, the data storage access privilege may authorize an app to request read, write, or read/write access to the RFDCS's data storage (e.g., hard drives, flash drives, non-volatile memory, etc.). The display access privilege may enable an app to have its own display tab to communicate with users, such as a marker on the main display or as its own display area (e.g., an app-specific tab and display accessible through the main display).

If the system determines not to grant required privileges to the app (i.e., determination block 1210="No"), the system may continue performing in determination block 1208. In an embodiment, when the system determines not to grant required privileges to the app because, for example, the app is requesting an exclusive privilege currently held by another app, the system may continue to monitor for subsequent privilege requests from the app and may make subsequent determination as to whether the app will receive the privileges requested. However, if the system determines to granted the privileges to the app (i.e., determination block 1210="Yes"), the system may put the app into "Startup Mode" in block 1212.

In an embodiment, after entering "Startup Mode," an app may request a certain allotment of system resources, such as certain amount of memory and MIPS (i.e., millions of instructions per second) the app to operate. In determination block 1214, the system may determine whether to grant resources to the app. In an embodiment, the system may not grant resources to an app when there are insufficient resources to meet the app's resource requirements. If the RF does not grant the resources to the app (i.e., determination block 1214="No"), the system may put the app into a "Suspended Mode" in block 1218.

In an embodiment, an app in "Suspended Mode" may not operate and, instead, must wait for system resources to become available. In an example, when an app is launched and requires more memory and/or MIPS than the system can allocate because the core system functions and other apps have already been allocated the available system resources, the app must wait until the system resources it requires is freed. In one embodiment, the system may determine whether a reattempt timer has expired in optional determination block 1222. The reattempt timer may cause the system to keep the app in "Suspended Mode" for a certain amount of time before re-determining whether system resources are available for the app. Thus, if the system determines that the reattempt timer has not expired (i.e., optional determination block 1222="No"), the system may continue waiting until the reattempt timer does expire. When the reattempt timer expires (i.e., optional determination block 1222="Yes"), the system may put the app back into "Startup Mode" in block 1212. This cycle of checking for available resource and putting the app into "Suspended Mode" may continue until sufficient system resources become available.

However, if the system does grant resources to the app (i.e., determination block 1214="Yes"), the system may put the app into "Starting Mode" in block 1216. In an embodiment, an app in "Starting Mode" may retrieve resource and prepare to begin executing on the RFDCS. "Starting Mode" is described in further detail with reference to FIG. 9. After putting the app into "Starting Mode," the system may put the app into "Running Mode" in block 1220. While in "Running Mode," the app may execute on the RFDCS. "Running Mode" is described in further detail with reference to FIG. 10.

In another embodiment, the system may determine whether the app is finished running in determination block 1224. For example, the app may only run for a certain amount of time to perform a particular transform (e.g., an offline transform of existing data), or the system may receive input from the user (locally, or via a remote interface) to terminate the app, such as when the user no longer desires to perform the app's transform or when the user has finished collecting RF data. In another example, the system may determine that the app has finished running when the RFDCS exits the geographic region where the app was scheduled to run (e.g., geo-fencing), or the system may determine that the time in which the app was scheduled to run has expired. Regardless of reason, when the system determines that the app has finished running (i.e., determination block 1224="Yes"), the system may put the app into "Stopping Mode" in block 1226. In an embodiment, the system may free the system resources allocated to an app in "Stopping Mode." The system may also return the app to "Info Mode" in block 1206.

Otherwise, the system may determines that the app is not finished running (i.e., determination block 1224="No"), and the system may continue performing in determination block 1224.

Figure 13:
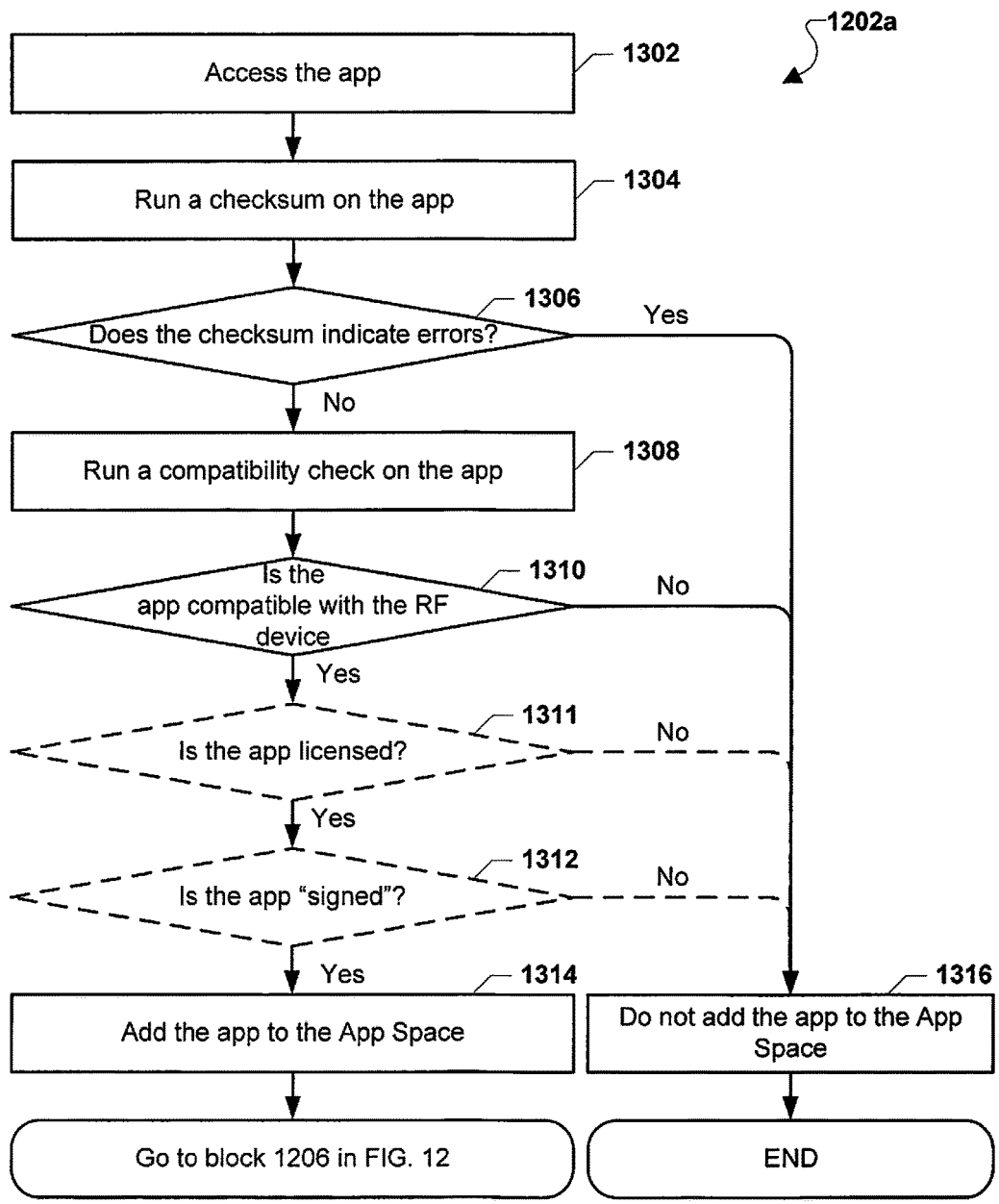
FIG. 13 is a process flow diagram illustrating an embodiment method for registering an app with the system.

FIG. 13 illustrates an embodiment method 1202*a* that may be implemented by a system operating on an RFDCS for registering an app. In an embodiment, method 1202*a* may correspond with the actions the system performs in block 1202 in FIG. 12. In various embodiments, the system may conduct a "vetting" process in which the system tests the app against various criteria before registering the app for use with the RFDCS.

In block 1302, the system may access the app. For example, the system may access the app by accessing the app's source code stored in memory on the RFDCS or in memory stored on a network.

In block 1304, the system may implement a checksum algorithm to check the app's integrity using known methods.

In an embodiment, the checksum procedure may reveal whether the app includes errors that may have been introduced when being loaded on the RFDCS. The system may also determine if the checksum indicates errors in determination block 1306.

If the system determines that the checksum indicates errors (i.e., determination block 1306="Yes"), the system may not add the app to the App Space in block 1316. The system may conclude performing the method 1202a. If the system determines that the checksum does not indicate errors (i.e., determination block 1306="No"), the system may run a compatibility check on the app in block 1308. For example, the system may determine whether the app is compatible with the RFDCS's operating system (e.g., Linux).

If the system determines that the app is not compatible with the RFDCS (i.e., determination block 1310="No"), the system may not add the app to the App Space in block 1316. The system may conclude performing the method 1202a. Otherwise, if the system determines that the app is compatible with the RFDCS (i.e., determination block 1310="Yes"), the system may optionally determine whether the app is licensed in optional determination block 1311. In an embodiment, an app may be "licensed" when the app is purchased from an authorized software dealer. In an embodiment, the only licensed apps are permitted to operate on the RFDCS.

If the system optionally determines that the app is not licensed (i.e., optional determination block 1311="No"), the system may not add the app to the App Space in 1316. The system may also conclude performing method 1202a. Otherwise, if the system optionally determines that the app is licensed (i.e., optional determination block 1311="Yes"), the system may optionally determine whether the app is "signed" in optional determination block 1312. In an embodiment, an app may be "signed" when it has some indicia of authenticity or a "signature." For example, an app may include credentials that verify that the app comes from a particular entity.

If the system determines that the app is not "signed" (i.e., optional determination block 1312="No"), the system may not add the app to the App Space in block 1316. The system may also conclude performing method 1202a. Otherwise, if the system determines that the app is "signed" (i.e., optional determination block 1312="Yes"), the system may add the app to the App Space in block 1314. In one embodiment, adding the app to the App Store may include making the app available for selection by a user by selecting an icon representing the app displayed on the RFDCS's display panel.

The system may continue performing in block 1206 in FIG. 12 by putting the app into "Info Mode."

Figure 14:
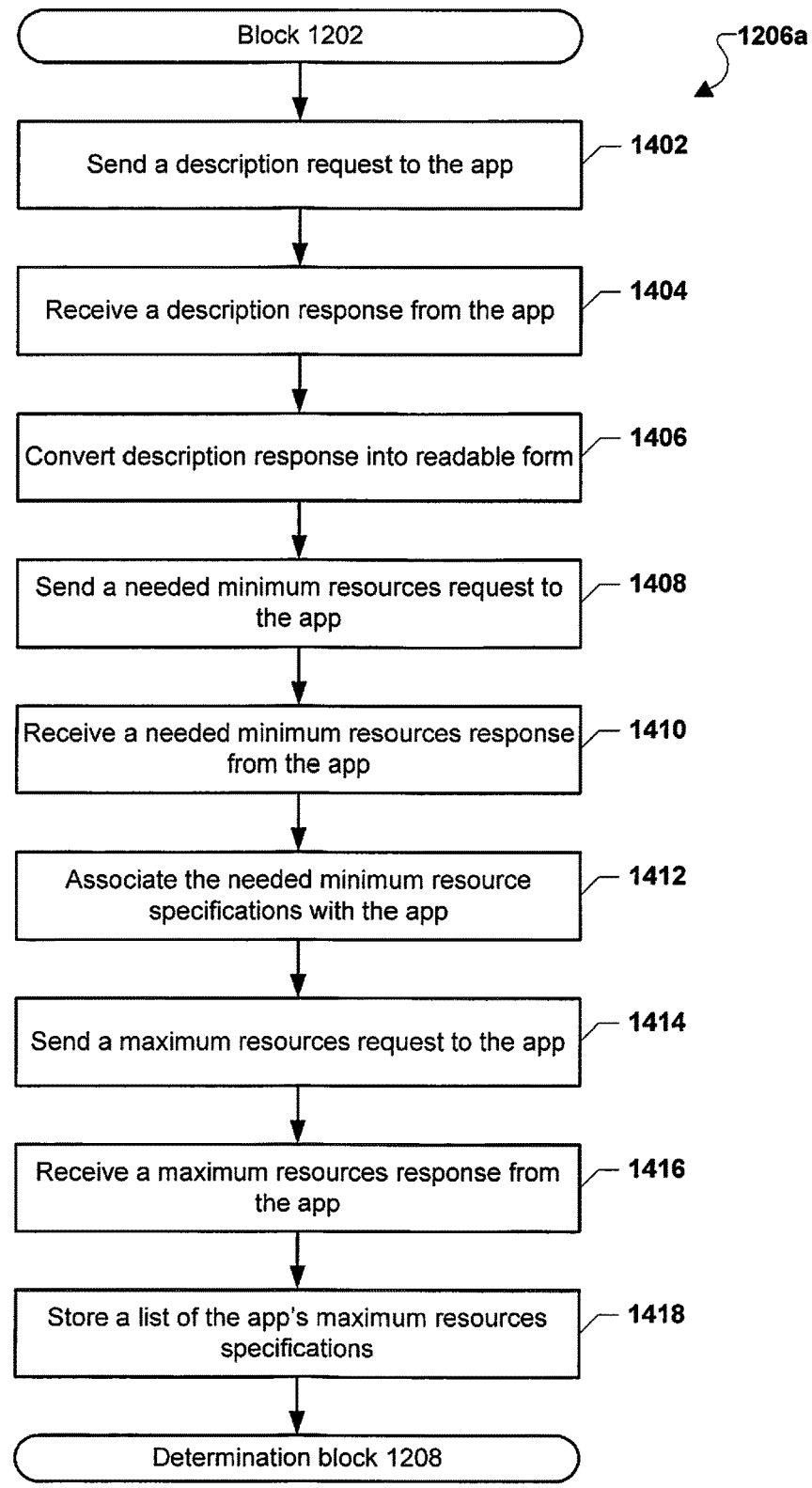
FIG. 14 is a process flow diagram illustrating an embodiment method for obtaining an app's resource requirements while the app is in "Info Mode."

FIG. 14 illustrates an embodiment method 1206a that may be implemented in an RFDCS when the system puts an app into "Info Mode." The steps performed in method 1206a may correspond to the operations described with reference to block 1206 in FIG. 12.

The system may begin performing method 1206a by sending a description request to the app in block 1402. In an embodiment, the request may require the app to send the system a description of the app that may be displayed to the user (e.g., a Unicode string including the description). The description may include the app's purpose and features, such as "An application for decimating raw RF data." The system may receive the description response from the app in block 1404, and the system may convert the description response into a readable form for the user in block 1406.

The system may also send a needed-minimum-resources request to the app in block 1408. In an embodiment, a needed-minimum-resources request may prompt the app to send a list of required system resources the app needs to operate. For example, the app may send a structure including the memory, MIPS, and privileges the app creator has determined are required for the app to function correctly. The system may receive the needed-minimum-resources response from the app in block 1410. The system may also associate the needed-minimum-resource specifications included in the needed-minimum-resources response with the app in block 1412. In an embodiment, the system may reference the app's minimum resource requirements when determining whether to grant system resources to the app as discussed with reference to determination block 1214 in FIG. 12.

In block 1414, the system may send a maximum-resources request to the app. In an embodiment, the maximum-resources request may prompt the app to send a list of resources the app may use under optimal conditions (i.e., if there were no limit to the system resources). In an embodiment, the app may have tiered "modes" of operation in which each tier requires more resources. For example, the app may perform simple transforms when limited system resources are available (i.e., a minimum-resources situation) and may perform complex transforms when ample system resources are available (i.e., a maximum-resources situation). The system may receive the app's maximum-resource response in block 1416. The system may also associate the maximum-resources specifications in the maximum-resources response with the app in block 1418. In an embodiment, the system may reference the app's minimum resource requirements when putting the app in "Running Mode" as described with reference to block 1220 in FIG. 12. In other words, the system may reference the app's maximum specifications to determine whether to allocate more resources to the app than what the app minimally requires.

The system may then determine whether it has received a request from the app for privileges in determination block 1208 in FIG. 12.

Figure 15:
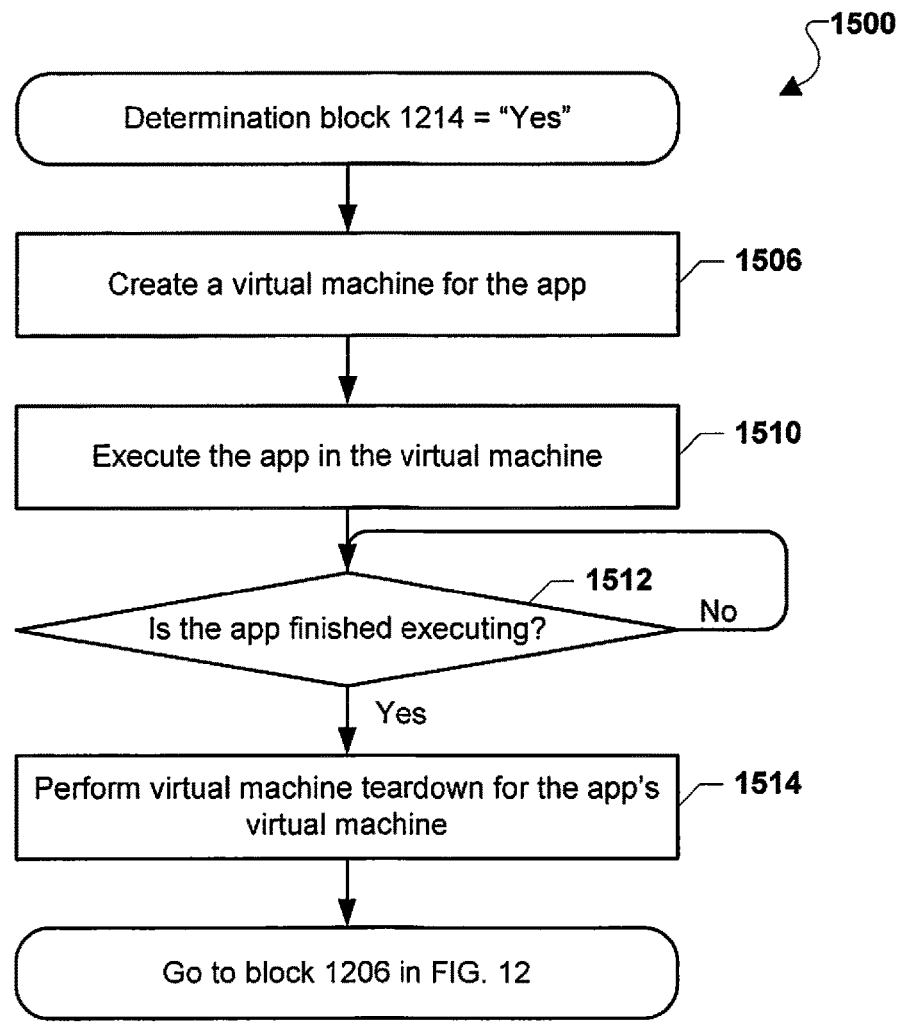
FIG. 15 is a process flow diagram illustrating an embodiment method for running an app in a virtual machine.

FIG. 15 illustrates an embodiment method 1500 that may be implemented by a system operating on a RFDCS for creating secure environments for apps executing on the RFDCS. The system may begin performing method 1500 when the system determines to grant resources to the app (i.e., determination block 1214="Yes" in FIG. 12).

The system may create a virtual machine for the app in block 1506. In various embodiments, the system may function as a virtual machine manager (a "VMM" or a hypervisor), wherein the system creates a secure environment (also known as a "sandbox") in which the app operates and wherein the system serves as an intermediary between the app and other processes or components of the RFDCS. Within the virtual machine, the app may be unable to access system resources that the system does not explicitly allocated to the app, and the app may be unaware of other processes or components operating on the RFDCS. For example, the system may assign the app one or more dedicated cores within a multi-core/multi-chip processor. In another example, the system may assign the app a logical artificial environment generated by another component on the RFDCS in which part of the app's allocated memory and resources are partitioned via the operating system or other software constructs. Thus, by making a virtual machine for the app, the system may securely separate the app's functions from the core system functions, thus protecting the stability and security of the core system functions in the event that the app contains unwanted or malicious code, for example. In block 1510, the system may execute the app in the virtual machine.

In determination block 1512, the system may determine whether the app is finished executing. If the system determines that the app has not finished executing (i.e., determination block 1512="No"), the system may continue performing in determination block 1512 by continuing to determine whether the app has finished executing. In other words, the system may wait until the app has finished executing.

Otherwise, if the system determines that the app has finished executing (i.e., determination block 1512="Yes"), the system may perform virtual machine teardown for the app's virtual machine in block 1514. For example, the system may perform virtual machine teardown by freeing the system resource allocated to the app. The system may continue performing in block 1206 in FIG. 12 by putting the app into "Info Mode."

Figure 16:
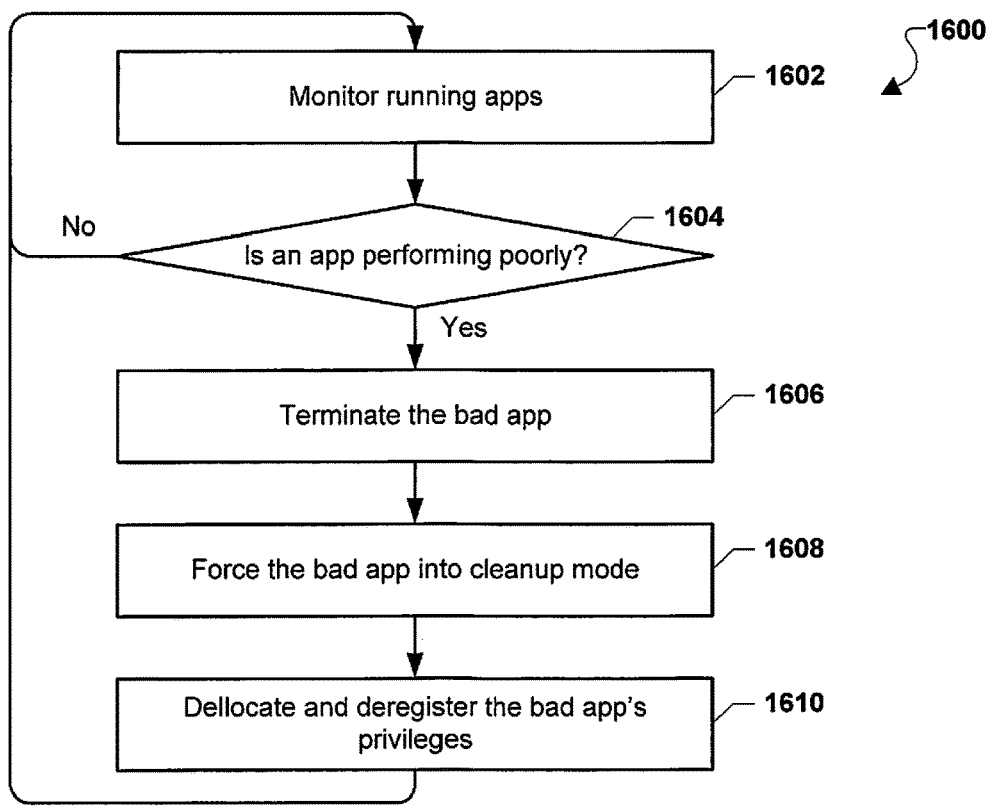
FIG. 16 is a process flow diagram illustrating an embodiment method for terminating poorly performing apps.

FIG. 16 illustrates an embodiment method 1600 that may be performed by a system operating on an RFDCS for monitoring problematic apps running on the RFDCS.

In block 1602, the system may monitor one or more apps running on the RFDCS. In an embodiment, the system may monitor each app operating on the RFDCS, as well as the transforms those apps perform. In an embodiment, the system may be monitoring the one or more apps for various "bad" behaviors that may include memory leaks, crashes, security breaches, watchdog monitoring, etc.

In determination block 1604, the system may determine whether any app is performing poorly. For example, the system may determine that a particular application has a memory leak that is negatively impacting its performance. If the system determines that no app is performing poorly (i.e., determination block 1604="No"), the system may continue monitoring the one or more apps in block 1602.

Otherwise, if the system determines that an app is performing poorly (i.e., determination block 1604="Yes"), the system may terminate the app performing poorly (i.e., the bad app) in block 1606. As part of the termination process, the system may also force the bad app into a cleanup mode in block 1608, whereby the bad app may be forced to free the memory and other system resources allocated to it. In block 1610, the system may also de-allocate and deregister the bad app's privileges, thereby preventing the bad app from accessing various aspects of the RFDCS. The system may continue performing in block 1602 by continuing to monitor the remaining apps running on the RFDCS.

Figure 17:
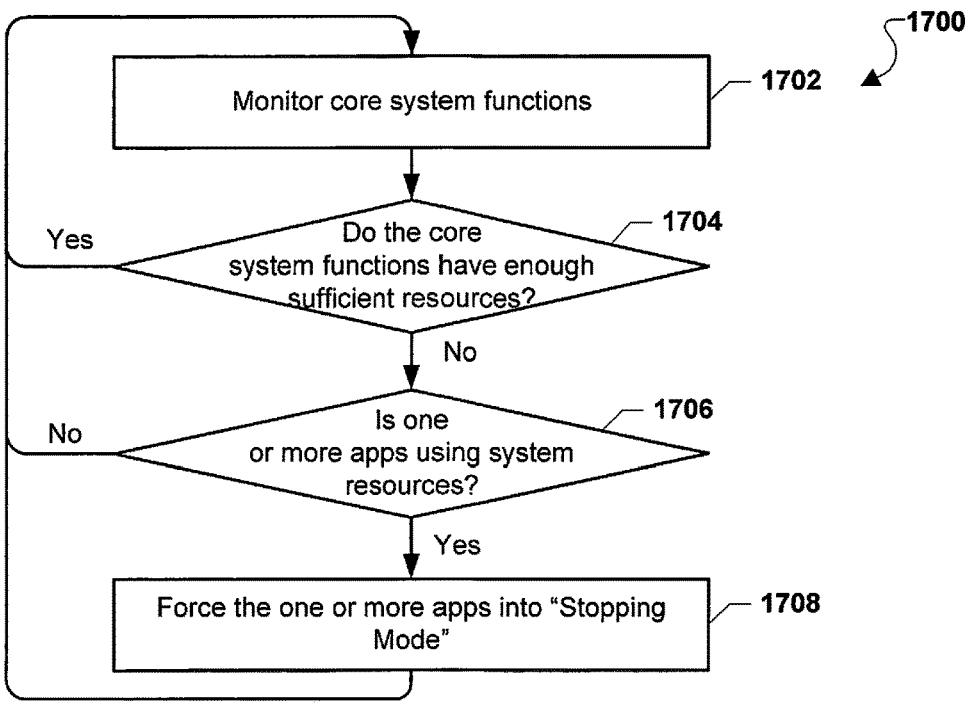
FIG. 17 is a process flow diagram illustrating an embodiment method for regulating system resources to ensure adequate core system functionality.

FIG. 17 illustrates an embodiment method 1700 that may be implemented by a system operating on a RFDCS for monitoring the RFDCS's core system functions. In the various embodiments, the system may continuously monitor the core system functions to ensure that the core system functions have adequate resources to operate adequately. In other words, the system may police the apps to make sure that running an app will not negatively impact the core functions of the system.

In determination block 1704, the system may determine whether the core system functions have sufficient resources. For example, the system may determine whether the RFDCS's high-level operating system (e.g., a Linux operating system) has sufficient resources to continue operating effectively. If the system determines that the core system functions have sufficient resources (i.e., determination block 1704="Yes"), the system may continue monitoring the core system functions in block 1702.

Otherwise, if the system determines that that the core system functions do not have sufficient resources (i.e., determination block 1704="No"), the system may determine whether one or more apps is using system resources in determination block 1706. If the system determines that one or more apps is not using system resources (i.e., determination block 1706="No"), the system may continue monitoring the core system functions in block 1702.

Otherwise, if the system determines that one or more apps is using system resources (i.e., determination block 1706="Yes"), the system may force one or more apps into "Stopping Mode." In other words, the system may select one or more of the apps running on the RFDCS and may force one or more of those apps to terminate, thereby freeing up resources for the core system functions. In another embodiment, the system may select which of the one or more apps will be terminated using various criteria, including selecting for termination the apps with the lowest priority, idle apps (i.e., apps that the user may have launched but has not used for a given period of time), or apps using the most system resources. The system may also continue operating in block 1702 by continuing to monitor the core system functions.

Figure 18:
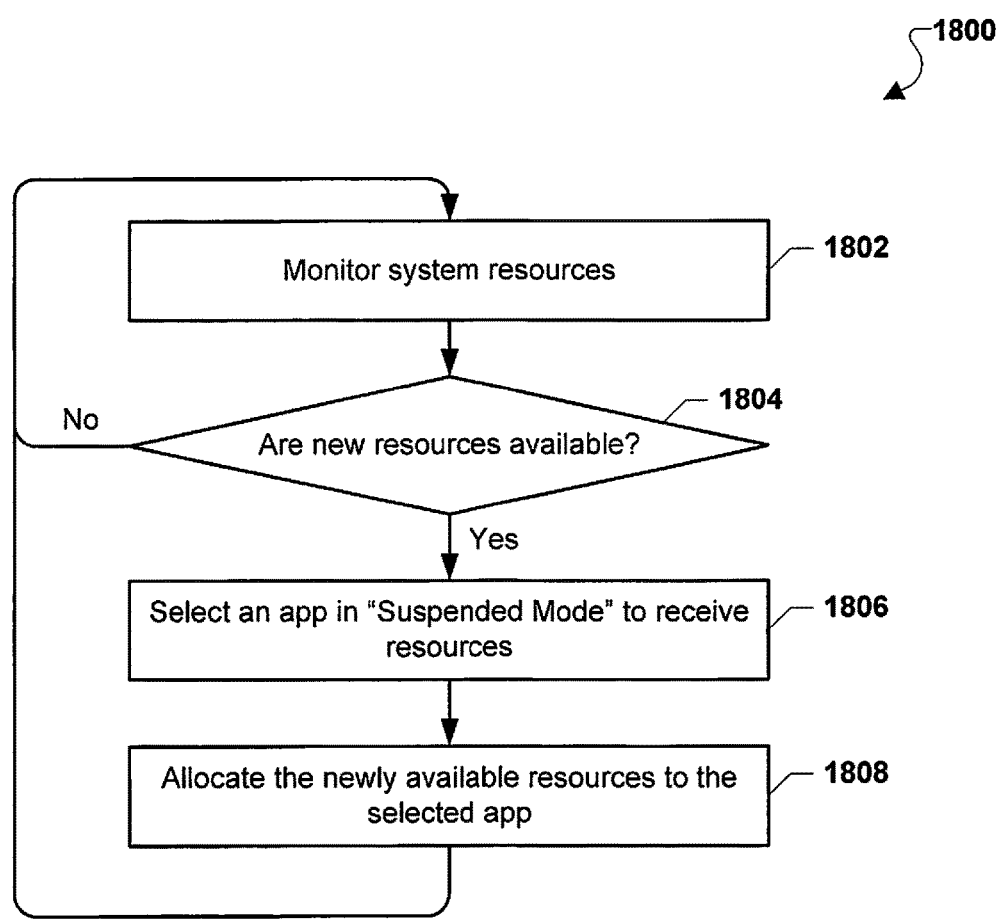
FIG. 18 is a process flow diagram illustrating an embodiment method for allocating new resources to apps in "Suspended Mode."

FIG. 18 illustrates an embodiment method 1800 that may be performed by a system operating on a RFDCS for allocating resources to apps in "Suspended Mode." The system may begin performing method 1800 by monitoring system resources in block 1802. In various embodiments, the system may monitor the availability of various system resources, including memory and hardware components.

In determination block 1804, the system may determine whether new resources are available. In an embodiment, new resource may have been made available after the user terminates another app, thereby freeing the resources allocated to that app. If the system determines that no new resources are available (i.e., determination block 1804="No"), the system may continue performing in block 1802 b monitoring the system resources.

Otherwise, if the system determines that new resource are available (i.e., determination block 1804="Yes"), the system may select an app in "Suspended Mode" to receive the resources in block 1806. As discussed above with reference to FIG. 8, an app in "Suspended Mode" may operate at a reduced capacity until its required amount of system resources is available.

In an embodiment, the system may implement various methods when selecting an app in "Suspended Mode" to receive resources. For example, each app may have a priority assigned from the system during registration, and the system may select the app that has the highest priority. In another example, the system, in an attempt to most efficiently utilize system resources, may select the app that has a minimum resources requirement closest to the amount of resources currently available. In yet another example, the system may select an app based on a "first-in-first-out" queue strategy, wherein the app that has been in "Suspended Mode" the longest may be selected to receive the resources. In a further embodiment, the system may only select an app to receive resources if those resources are minimally sufficient for the app to operate.

The system may allocate the newly available resources to the selected app in block 1808. The system may continue operating in block 1802 by continuing to monitor the system resources.

In the various embodiments, the RFDCS may host apps with various functionalities and capabilities. The following list includes examples of apps and their respective functionalities that may be included in the App Space on the RFDCS according to various embodiments:

Frequency Sweep App. The app makes a frequency sweep, where frequency(s) can be loaded (long list of centers) and the dwell time at each (dwell time may change at each frequency). This only applies to controlling the receive AND/OR transmit circuitry for whatever purpose it may intend (be that recording many bandwidths, sending a CW arb definition across a whole band in a frequency sweep, etc.). Used in this way, a CW Sweep tool could easily be created, as well as the ability to collect samples of a much larger spectrum area than the fundamental system bandwidth.

Multipath Generator App. The app make a Real Time Multipath Generator that can have from 1 to 10 images offset by a certain number of nano-seconds each (individually settable delay) from the impulse in, along with independently settable power adjustments (+10 dB to −30 dB minimum, but larger amounts are acceptable). Key parameter of interest is what the first image can be in time from the actual impulse (basically the system delay from input to output). Recording of the original signal is all that is required and optional. The app should work on real time as well as be able to be applied to any file being played back. The main use case is feeding a real world or signal generator signal in the Rx port, then taking the Tx port feed to test equipment under test (so not in the same medium). If it were in the same medium (e.g., combiner or over the air) then the feedback handling need not be filtered out by the system and is the responsibility of the medium provider to their unique need (e.g., a spatial diversity).

Real Time (or Near Real Time) Decoder App. Would work against real time Rx data (or against a playback file) to decode the RF data into its source. Examples include a FM demodulator, AM Demodulator to more complex things like Cellular demodulation of layer 3 data. The decoded data can be displayed, logged into a separate format, or played back in the case of audio through speakers. Using this app would let the RFDCS function as a radio.

Real Time (or Near Real Time) Transmitter App. Would let the RFDCS function as a modulation device, like a FM Transmitter or, when run in combination with the decoder, as a full duplex radio system. Users could use the microphone on the RFDCS, or any other data feed, and use the App to modulate and transmit the signal to any compatible waveform.

Antenna Selector App. This app monitors the record and transmit frequency(s), and uses the GPIO to control signals to switch in/out antennas, amplifiers, or other external devices.

Customer Control Interface App. This app monitors the Ethernet on a specific port to allow command and control of the system from a remote location. For example, this is how a remove interface works (as an app), as well as GPIB or many other industry standard control methods that may be needed.

Scheduled Backhaul App. This app may automatically launch when plugged into eSATA and may follow user selected parameters to offload the data to a known location and may also clear the drives. This app may be useful in situations such as when a technician brings equipment back to the home base at night and readies the equipment with clean drives for the next day without losing data.

A Repeater App. This app loops Rx lines to transmit (at the same, or in a different, frequency of choice) such that the system can be used as a fully passive repeater of a RF input signal to a RF Distribution network. Combined with Antenna Selector, this app may include use of external gain circuits to step up lower power signals with appropriate filtering.

User Specific Data Display App. The app may use the data being received and/or transmitted and may display the data in a different way—examples may include an I/Q diagram, Waterfall plots, markers, different resolution bandwidths, prefilters (e.g., averaging), etc.

Signal Comparer App. The app may compare current data from the RF environment against previously recorded data and visually indicate any significant differences in the environment for purposes of comparing differences either between locations and/or over time in a signal location. This app may be useful, for instance, in detecting network retuning.

Interference Detector App. The app may use known reference signals or feeding in of the "ideal" signal to determine, via subtraction or similar operations, the signals interfering with the desired signal. Upon detection, using various techniques, direction finding and/or location algorithms may be performed to discover the source of the interference.

Network Analyzer App. The app would use the RX and TX paths to create a network analyzer capable of sweeping a device under test to determine its RF performance.

Additional Apps. With the right app, the RFDCS can be a signal generator, a radio, a scanner, a power meter, a calibration tool, a device tester, etc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing an application (app) on a radiofrequency digitization and collection device having a system controller, the method comprising:
  receiving, at the radiofrequency digitization and collection device, a request to launch an app included in an application storage and retrieval space (App Space) of the radiofrequency digitization and collection device;
  obtaining, by the system controller, privilege and resource requirement information from the app included in the App Space of the radiofrequency digitization and collection device in response to receiving the request to launch the app included in the App Space of the radiofrequency digitization and collection device;
  executing the app in a first operation mode in response to including the app in the App Space;
  creating a software execution environment, by the system controller, for the app based on the privilege and resource requirement information obtained by the system controller from the app; and
  executing the app in the created software execution environment subsequent to executing the app in the first operation mode, wherein executing the app comprises processing data associated with RF signals received at the radiofrequency digitization and collection device, wherein the app is executed in a second operation mode, different from the first operation mode, in the created software execution environment.

2. The method of claim 1, further comprising:
  determining whether the app is finished running;
  stopping the app in response to determining that the app is finished running; and
  performing, by the system controller, teardown of the software execution environment in response to determining that the app is finished running.

3. The method of claim 1, further comprising:
  determining whether the app can run on the radio frequency digitization and collection device;
  adding the app to the App Space in response to determining that the app can run on the radiofrequency digitization and collection device; and
  not adding the app to the App Space in response to determining that the app cannot run on the radiofrequency digitization and collection device.

4. The method of claim 3, wherein it is determined that the app cannot run on the radiofrequency digitization and collection device when any combination of at least one of the following is true:
  a checksum algorithm run on the app indicates errors;
  the app is incompatible with the radiofrequency digitization and collection device;
  the app is not licensed; and
  the app is not signed.

5. The method of claim 2, wherein creating the software execution environment comprises:
  creating a virtual machine for the app in response to determining to grant resources and privileges to the app,
  wherein executing the app in the software created execution environment comprises:
  executing the app in the virtual machine, and
  wherein performing the teardown of the software execution environment comprises:
  performing the teardown of the virtual machine in response to determining that the app is finished running.

6. The method of claim 1, further comprising:
  monitoring a running app on the radiofrequency digitization and collection device;
  determining whether a performance indicator associated with the running app is less than a predetermined performance threshold; and
  performing actions comprising the following in response to determining that the performance indicator associated with the running app is less than the predetermined performance threshold:
  terminating the running app;
  forcing the running app into cleanup mode; and de-allocating and deregistering the running app's resources and privileges.

7. The method of claim 1, further comprising:
monitoring core system functions;
determining whether the core system functions have sufficient resources to operate above a predetermined performance threshold;
determining whether the app is using system resources in response to determining that the core system functions do not have sufficient resources to operate above the predetermined performance threshold; and
stopping the app in response to determining that the app is using the system resources.

8. The method of claim 1, further comprising:
monitoring system resources;
determining whether new resources are available; and
performing actions comprising the following in response to determining that the new resources are available;
selecting a suspended app to receive the new resources; and
allocating the new resources to the suspended app.

9. The method of claim 1, further comprising:
adding the app to a user interface; and
displaying an app-specific user interface associated with the app while the app is running.

10. The method of claim 1, wherein the request to launch the app is generated locally at the radiofrequency digitization and collection device or at a device remote from the radiofrequency digitization and collection device.

11. The method of claim 1, further comprising:
determining, by the system controller, whether the app can run on the radiofrequency digitization and collection device and whether to grant resources and access privileges of components of the radiofrequency digitization and collection device to the app included in the App Space in response to obtaining the privilege and resource requirement information from the app,
wherein the software execution environment is created for the app by the system controller in response to determining to grant the resources and access privileges to the app.

12. A radiofrequency digitization and collection device, comprising:
means for receiving a request to launch an application (app) included in an application storage and retrieval space (App Space) of the radiofrequency digitization and collection device;
means for obtaining privilege and resource requirement information from the app included in the App Space of the radiofrequency digitization and collection device in response to receiving the request to launch the app included in the App Space of the radiofrequency digitization and collection device;
means for executing the app in a first operation mode in response to including the app in the App Space;
means for creating a software execution environment for the app based on the privilege and resource requirement information obtained by the system controller from the app; and
means for executing the app in the created software execution environment subsequent to executing the app in the first operation mode, wherein the means for executing the app comprises means for processing data associated with RF signals received at the radiofrequency digitization and collection device, wherein the means for executing the app in the created software execution environment further comprises means for executing the app in a second operation mode, different from the first operation mode, in the created software execution environment.

13. The radiofrequency digitization and collection device of claim 12, further comprising:
means for determining whether the app is finished running;
means for stopping the app in response to determining that the app is finished running; and
means for performing teardown of the software execution environment in response to determining that the app is finished running.

14. The radiofrequency digitization and collection device of claim 12, further comprising:
means for determining whether the app can run on the radiofrequency digitization and collection device;
means for adding the app to the App Space in response to determining that the app can run on the radiofrequency digitization and collection device; and
means for not adding the app to the App Space in response to determining that the app cannot run on the radiofrequency digitization and collection device.

15. The radiofrequency digitization and collection device of claim 14, wherein it is determined that the app cannot run on the radiofrequency digitization and collection device when any combination of at least one of the following is true:
a checksum algorithm run on the app indicates errors;
the app is incompatible with the radiofrequency digitization and collection device;
the app is not licensed; and
the app is not signed.

16. The radiofrequency digitization and collection device of claim 12, wherein the request to launch the app may be generated locally at the radiofrequency digitization and collection device or at a device remote from the radiofrequency digitization and collection device.

17. The radiofrequency digitization and collection device of claim 12, further comprising:
means for determining, by the system controller, whether the app can run on the radiofrequency digitization and collection device and whether to grant resources and access privileges of components of the radiofrequency digitization and collection device to the app included in the App Space in response to obtaining the privilege and resource requirement information from the app,
wherein the software execution environment is created for the app by the system controller in response to determining to grant the resources and access privileges to the app.

18. A radiofrequency digitization and collection device, comprising:
an antenna configured to receive RF signals; and
a processor configured with processor-executable instructions to perform operations comprising:
receiving data associated with RF signals received at the antenna;
receiving a request to launch an application (app) included in an application storage and retrieval space (App Space) of the radiofrequency digitization and collection device;
obtaining privilege and resource requirement information from the app included in the App Space of the radiofrequency digitization and collection device in response to receiving the request to launch the app included in the App Space of the radiofrequency digitization and collection device;

executing the app in a first operation mode in response to including the app in the App Space;

creating a software execution environment for the app based on the privilege and resource requirement information obtained by the system controller from the app; and executing the app in the created software execution environment subsequent to executing the app in the first operation mode, wherein executing the app comprises processing the data associated with the RF signals received at the antenna of the radiofrequency digitization and collection device, wherein the app is executed in a second operation mode, different from the first operation mode, in the created software execution environment.

19. The radiofrequency digitization and collection device of claim 18, wherein the processor is configured with processor-executable instructions to perform operations further comprising:

determining whether the app is finished running;

stopping the app in response to determining that the app is finished running; and performing teardown of the software execution environment in response to determining that the app is finished running.

20. The radiofrequency digitization and collection device of claim 18, wherein the processor is configured with processor-executable instructions to perform operations further comprising:

determining whether the app can run on the radiofrequency digitization and collection device;

adding the app to the App Space in response to determining that the app can run on the radiofrequency digitization and collection device; and not adding the app to the App Space in response to determining that the app cannot run on the radiofrequency digitization and collection device.

21. The radiofrequency digitization and collection device of claim 20, wherein the processor determines that the app cannot run on the radiofrequency digitization and collection device when any combination of at least one of the following is true:

a checksum algorithm run on the app indicates errors;

the app is incompatible with the radiofrequency digitization and collection device;

the app is not licensed; and the app is not signed.

22. The radiofrequency digitization and collection device of claim 19, wherein the processor is configured with processor-executable instructions to perform operations such that:

creating the software execution environment comprises creating a virtual machine for the app in response to determining to grant resources and privileges to the app;

executing the app in the software execution environment comprises executing the app in the virtual machine; and performing the teardown of the software execution environment comprises performing teardown of the virtual machine in response to determining that the app is finished running.

23. The radiofrequency digitization and collection device of claim 18, wherein the processor is configured with processor-executable instructions to perform operations further comprising:

monitoring a running app on the radiofrequency digitization and collection device;

determining whether a performance indicator associated with the running app is less than a predetermined performance threshold; and performing actions comprising the following in response to determining that the performance indicator associated with the running app is less than the predetermined performance threshold:

terminating the running app;

forcing the running app into cleanup mode; and de-allocating and deregistering the running app's resources and privileges.

24. The radiofrequency digitization and collection device of claim 18, wherein the processor is configured with processor-executable instructions to perform operations further comprising:

monitoring core system functions;

determining whether the core system functions have sufficient resources to operate above a predetermined performance threshold;

determining whether the app is using system resources in response to determining that the core system functions do not have sufficient resources to operate above the predetermined performance threshold; and stopping the app in response to determining that the app is using the system resources.

25. The radiofrequency digitization and collection device of claim 18, wherein the processor is configured with processor-executable instructions to perform operations further comprising:

monitoring system resources;

determining whether new resources are available; and performing actions comprising the following in response to determining that the new resources are available;

selecting a suspended app to receive the new resources; and allocating the new resources to the suspended app.

26. The radiofrequency digitization and collection device of claim 18, wherein the processor is configured with processor-executable instructions to perform operations further comprising:

adding the app to a user interface; and displaying an app-specific user interface associated with the app while the app is running.

27. The radiofrequency digitization and collection device of claim 18, wherein the request to launch the app is generated locally at the radiofrequency digitization and collection device or at a device remote from the radiofrequency digitization and collection device.

28. The radiofrequency digitization and collection device of claim 18, wherein the processor is configured with processor-executable instructions to perform operations further comprising:

determining whether the app can run on the radiofrequency digitization and collection device and whether to grant resources and access privileges of components of the radiofrequency digitization and collection device to the app included in the App Space in response to obtaining the privilege and resource requirement information from the app, wherein the software execution environment is created for the app by the processor in response to determining to grant the resources and access privileges to the app.

* * * * *